US008306260B2

(12) United States Patent
Zhu et al.

(10) Patent No.: US 8,306,260 B2
(45) Date of Patent: Nov. 6, 2012

(54) SYSTEM FOR 3D MONITORING AND ANALYSIS OF MOTION BEHAVIOR OF TARGETS

(75) Inventors: Liqun Zhu, Coram, NY (US); Jianning Wang, Stonybrook, NY (US); Rong Su, Coram, NY (US); Wei Weng, Patchogue, NY (US)

(73) Assignee: inGenious Targeting Laboratory, Inc., Stony Brook, NY (US)

( * ) Notice: Subject to any disclaimer, the term of this patent is extended or adjusted under 35 U.S.C. 154(b) by 1162 days.

(21) Appl. No.: 11/953,163

(22) Filed: Dec. 10, 2007

(65) Prior Publication Data

US 2008/0152192 A1 Jun. 26, 2008

Related U.S. Application Data

(63) Continuation of application No. PCT/US2006/026602, filed on Jul. 7, 2006.

(60) Provisional application No. 60/697,135, filed on Jul. 7, 2005.

(51) Int. Cl.
*G06K 9/00* (2006.01)

(52) U.S. Cl. ........................................ 382/103; 348/169

(58) Field of Classification Search .................. 382/100, 382/103, 110, 128, 133, 134, 154; 348/143, 348/169–172

See application file for complete search history.

(56) References Cited

U.S. PATENT DOCUMENTS

| | | | | |
|---|---|---|---|---|
| 5,675,404 | A * | 10/1997 | Nakazawa et al. | 356/4.01 |
| 6,233,007 | B1 | 5/2001 | Carlbom et al. | 348/157 |
| 2004/0141636 | A1 | 7/2004 | Liang et al. | 382/110 |
| 2005/0008220 | A1 | 1/2005 | Miyazaki | 382/154 |
| 2005/0078178 | A1 * | 4/2005 | Brown et al. | 348/139 |
| 2005/0083333 | A1 * | 4/2005 | Gordon | 345/475 |
| 2006/0010028 | A1 * | 1/2006 | Sorensen | 705/10 |
| 2006/0110049 | A1 * | 5/2006 | Liang et al. | 382/224 |
| 2006/0179014 | A1 * | 8/2006 | Yoshida et al. | 706/12 |

OTHER PUBLICATIONS

I-Chen Lin et al., "Extracting 3D Facial Animation Parameters from Multiview Video Clips," IEEE Computer Graphics and Applications, pp. 72-80, Nov./Dec. 2002.

(Continued)

*Primary Examiner* — Anand Bhatnagar
(74) *Attorney, Agent, or Firm* — Fitzpatrick, Cella, Harper & Scinto

(57) ABSTRACT

The present invention relates to a system for the 3-D monitoring and analysis of motion-related behavior of test subjects. The system comprises an actual camera, at least one virtual camera, a computer connected to the actual camera and the computer is preferably installed with software capable of capturing the stereo images associated with the 3-D motion-related behavior of test subjects as well as processing these acquired image frames for the 3-D motion parameters of the subjects. The system of the invention comprises hardware components as well as software components. The hardware components preferably comprise a hardware setup or configuration, a hardware-based noise elimination component, an automatic calibration device component, and a lab animal container component. The software components preferably comprise a software-based noise elimination component, a basic calibration component, an extended calibration component, a linear epipolar structure derivation component, a non-linear epipolar structure derivation component, an image segmentation component, an image correspondence detection component, a 3-D motion tracking component, a software-based target identification and tagging component, a 3-D reconstruction component, and a data post-processing component In a particularly preferred embodiment, the actual camera is a digital video camera, the virtual camera is the reflection of the actual camera in a planar reflective mirror. Therefore, the preferred system is a catadioptric stereo computer vision system.

35 Claims, 35 Drawing Sheets

OTHER PUBLICATIONS

Jana Chrásková et al., "An Automatic 3D Tracking System with a PC and a single TV Camera," Journal of Neuroscience Methods, vol. 88, pp. 195-200, 1999.

Satoru Kato et al., "A Computer Image Processing System for Quantification of Zebrafish Behavior," Journal of Neuroscience Methods, vol. 134, pp. 1-7, 2004.

* cited by examiner

| Method | Coordinate System Setup | Displacement | Velocity | Acceleration |
|---|---|---|---|---|
| 2D | on a specific (XY) plane | $d_x, d_y, \phi_z$ | $v_x, v_y, \omega_z$ | $a_x, a_y, \alpha_z$ |
| 3D | any (XYZ) in 3D space | $d_x, d_y, d_z, \phi_x, \phi_y, \phi_z$ | $v_x, v_y, v_z, \omega_x, \omega_y, \omega_z$ | $a_x, a_y, a_z, \alpha_x, \alpha_y, \alpha_z$ |

FIGURE 29

| Domain | Type | On Vectors | On Scalars |
|---|---|---|---|
| Time-domain | Linear | Locations in X, Y & Z | Swimming trajectories on XY, XZ, YZ planes and in 3D space |
| | | Displacement in X, Y & Z | Travel distance in X, Y, Z and 3D space |
| | | Swimming velocity in X, Y & Z | Swimming speed in X, Y, Z and 3D space |
| | | Acceleration in X, Y & Z | Speed burst rate in X, Y, Z and 3D space |
| | Angular | Angular displacement about X, Y & Z | Turning angles about X, Y, Z and 3D space |
| | | Angular velocity about X, Y & Z | Turning speed about X, Y, Z and 3D space |
| | | Angular acceleration about X, Y & Z | Burst rate in turning speed about X, Y, Z and in 3D space |
| | Other | Proximity from defined points in 3D space | |
| | | Time spent in motion or in stationary | |
| | | Space utilization and space preference in 3D space | |
| | | Curvature and complexity of 3D swimming path | |
| | | Relative distance and positions of multiple animals | |
| | | Other user-defined motion attributes | |
| Frequency-domain | Linear | Power spectral density (PSD) of motion velocity in X, Y, Z | PSD of swimming speed in X, Y, Z and in 3D space |
| | | PSD of acceleration in X, Y, Z | PSD of speed burst rate in X, Y, Z and in 3D space |
| | Angular | PSD of angular velocity about X, Y, Z | PSD of turning speed about X, Y, Z and in 3D space |
| | | PSD of angular acceleration about X, Y, Z | PSD of burst rate in turning speed about X, Y, Z and in 3D space |
| | Other | PSD of distances or locations from a defined point in 3D space | |
| | | PSD of the appearance of animal in specified locations | |
| | | PSD of the curvature of swimming path | |
| | | PSD of relative distance and positions of multiple fish | |
| | | Other spectral features of user-defined motion attributes | |

FIGURE 30

| Group name | ethonol/water concentration (vol. %) | # of fish |
|---|---|---|
| Control | 0 | 14 |
| Test 1 | 0.25 | 9 |
| Test 2 | 0.5 | 9 |
| Test 3 | 1 | 9 |
| Test 4 | 1.5 | 9 |

| One-way ANOVA results | Dist. from center | 3D speed | 3D angular speed |
|---|---|---|---|
| P value | 5.9E-05* | 1.0E-04* | 4.1E-01 |

FIGURE 33

| P value from post-hoc mean comparison | Control | Test 1 | Test 2 | Test 3 | Test 4 |
|---|---|---|---|---|---|
| Control | - | 3.0E-01 | 3.1E-01 | 5.2E-03* | 2.5E-04* |
| Test 1 | | - | 4.4E-01 | 4.9E-03* | 7.5E-03* |
| Test 2 | | | - | 6.8E-04* | 1.6E-03* |
| Test 3 | | Symmetric | | - | 4.6E-01 |
| Test 4 | | | | | - |

| P value from post-hoc mean comparison | Control | Test 1 | Test 2 | Test 3 | Test 4 |
|---|---|---|---|---|---|
| Control | - | 7.5E-02 | 1.7E-01 | 3.8E-03* | 8.1E-03* |
| Test 1 | | - | 4.6E-01 | 7.5E-03* | 2.1E-02* |
| Test 2 | | | - | 7.0E-03* | 2.3E-02* |
| Test 3 | | *Symmetric* | | - | 2.2E-01 |
| Test 4 | | | | | - |

FIGURE 34

| P value from Student-t test | Control | 0.1 g/kg | 0.2 g/kg | 0.5 g/kg | 1.0 g/kg | 2.0 g/kg |
|---|---|---|---|---|---|---|
| Control | - | 1.0E-01 | 2.4E-01 | 2.3E-02* | 1.9E-02* | 1.0E-02* |
| 0.1 g/kg | | - | 1.4E-01 | 9.0E-03* | 7.9E-02 | 4.9E-02* |
| 0.2 g/kg | | | - | 9.0E-03* | 8.0E-03* | 4.0E-03* |
| 0.5 g/kg | | *Symmetric* | | - | 2.6E-01 | 2.0E-01 |
| 1.0 g/kg | | | | | - | 4.4E-01 |
| 2.0 g/kg | | | | | | - |

FIGURE 35

| P value from Student-t test | Control | 0.1 g/kg | 0.2 g/kg | 0.5 g/kg | 1.0 g/kg | 2.0 g/kg |
|---|---|---|---|---|---|---|
| Control | - | 2.1E-01 | 1.7E-02 | 4.0E-03* | 3.0E-03* | 1.7E-01 |
| 0.1 g/kg | | - | 1.1E-01 | 2.2E-01 | 1.8E-02* | 4.3E-01 |
| 0.2 g/kg | | | - | 2.2E-01 | 9.2E-02 | 4.6E-02* |
| 0.5 g/kg | | Symmetric | | - | 2.3E-01 | 1.0E-02* |
| 1.0 g/kg | | | | | - | 7.0E-03* |
| 2.0 g/kg | | | | | | - |

FIGURE 36

| P value from Student-t test | Control | 0.1 g/kg | 0.2 g/kg | 0.5 g/kg | 1.0 g/kg | 2.0 g/kg |
|---|---|---|---|---|---|---|
| Control | - | 3.00E-01 | 1.60E-01 | 1.7E-02* | 1.0E-02* | 2.0E-03* |
| 0.1 g/kg | | - | 3.60E-01 | 1.2E-02* | 2.7E-02* | 8.0E-03* |
| 0.2 g/kg | | | - | 1.2E-02* | 2.0E-03* | 2.0E-04* |
| 0.5 g/kg | | *Symmetric* | | - | 2.5E-02* | 5.0E-04* |
| 1.0 g/kg | | | | | - | 5.0E-02* |
| 2.0 g/kg | | | | | | - |

FIGURE 37

SYSTEM FOR 3D MONITORING AND ANALYSIS OF MOTION BEHAVIOR OF TARGETS

CROSS REFERENCE RELATED APPLICATIONS

This application is a continuation of International Patent Application No. PCT/US2006/026602 filed on Jul. 7, 2006 which claims priority to U.S. Provisional Patent Application No. 60/697,135 filed Jul. 7, 2005.

BACKGROUND OF THE INVENTION

1. Copyright Notice

A portion of this patent document contains materials, which are subject to copyright protection. The copyright owner has no objection to the facsimile reproduction by anyone of the patent document or the patent disclosure, as it appears in the Patent and Trademark office patent file or records, but otherwise reserves all copyright rights whatsoever.

2. Field of the Invention

Generally, the present invention relates to the monitoring and analysis of the behavioral phenotype of targets, such as vertebrates (e.g. zebra fish, or *Danio rerio*, More specifically, one aspect of the invention is directed to the automatic monitoring and analysis of the 3-D motion-related behavior of laboratory animals, such as locomotion activity, motor activity, home cage behavior, aggression, antipredatory, group preference, and light preference paradigms, under specific behavioral paradigm experiments, for a individual animal, or a group (school) of animals, in either real-time and on-line mode or off-line mode. The laboratory animals can be genetically altered animals after knock-in, knock-out, or transgenic operation, or experimental animals after being exposed to drugs, chemicals or certain environments.

3. Related Art

Experimental laboratory animals such as wild-type animals, genetically altered (transgenic, knock-in, or knock-out) animals, drug-treated animals, and animals after chemical mutagenesis operations, have been extensively used as human models in various biological, clinical, biomedical, environmental, and military research areas, including genomic research, studies of genetic functional disorders, phenotypic drug screening, toxicology, bio-sensing, and bio-defense, just to name a few. This is due to the fact that humans and animals share extensive genetic and neuroanatomical homologies, which are widely conserved among different species. The behavior studies of the animal models are particularly useful in post-genomic research areas towards identifying known genotypes, quantifying the behavior responses induced by various neurological disorders, and revealing the toxicity and efficacy of drug candidates.

Deficiencies in motor function may be caused by genetic mutations or by the effects of chemical compounds. Motion-related animal behavioral studies are useful in understanding the effects of different genotypes on the development of various motion-related functional diseases, such as Huntington's disease and Parkinson's disease, as well as the effects of drugs or any chemical compound on humans. Typical animal models used for these purposes include rodents such as mice and rats, vertebrates such as zebrafish and goldfish, and insects such as drosophilae. A variety of standardized animal behavioral tests have been designed with these models. For example, the behavioral tests for rodents are composed of open field, home cage, water maze, and social behavior paradigms, while the behavioral tests for vertebrates are composed of swimming locomotor activity, antipredatory behavior, and group preference paradigms. The key parameters describing the phenotypic behavior have been defined for these tests. For example, the swimming locomotive behavior of zebrafish can be classified and analyzed by traveling distance, swimming speed, turning angle, average rate of change of direction (RCDI), net to gross displacement ratio (NGDR), body wave shape, and tail beat amplitude and frequency, etc.

Among all the standardized behavioral tests for laboratory animals of various species, motion information and spontaneous activity information are of great importance for phenotypic screening. Such information can be obtained from open field (for locomotor activity test) and home cage paradigms.

The monitoring of motion patterns of laboratory animals has historically been accomplished by human observation and/or off-line manual counting on pre-recorded videotapes, which inevitably resulted in inaccurate, inadequate, and subjective data and observation results. Furthermore, human observation methods have significant drawbacks such as lacking of quantitative data, large observation variations, labor-intensiveness, high costs, and missing of information along the depth direction of human eyes. Recently, researchers have developed various computerized apparatuses and methods to automatically monitor the locomotion/motor behavior of animals, including photobeam cage, force actoplate, and 2-D video recording combining with off-line video sequence analysis, just to list a few. See, e.g., S. Kato, et al, *A computer image processing system for quantification of zebrafish behavior*, Journal of Neuroscience Methods, 134 (2004), 1-7; and J. Chraskova, et al., *An automatic 3-D tracking system with a PC and a single TV camera*, Journal of Neuroscience Methods, 88(1999), 195-200. Among these methods, the video recording method has unique advantages over other methods, such as non-contact setup, high sampling frequency, high spatial resolution, long monitoring period, the ability of tracking the motion of specific parts of the body, and versatility in tracking the motion of different species. Therefore, the 2-D video recording and analysis method is more widely applied in the field of animal behavior monitoring and analysis.

However, there are still significant drawbacks associated with the existing 2-D video monitoring and analysis systems. For example, existing video monitoring systems typically collect those kinematical parameters describing animal planar motion only by using a single video camera, i.e., a horizontal plane if the camera views from the top of the motion field. The camera of existing 2-D video systems generally shoots a single view of the animal container thus losing information along other spatial axes, such as the camera axis perpendicular to the plane defined by the image plane of the camera. Consequently, existing 2-D video systems (e.g., the system described by S. Kato, et al., Journal of Neuroscience Methods, 134(2004), 1-7) generally can not detect the upward or downward motion of the tested animals, e.g., the rearing motion of mice and up-and-down swimming motion of zebrafish, because the camera usually shoots from the top of a mouse cage or fish tank. In addition, existing video tracking systems have limited capability in monitoring multiple moving animals residing in the same container and lose the motion information associated with certain animals if the animals being tracked are occluded by other animals, or if part of the animal body, which may be of interest, is occluded by the animal body itself. For example, the footpath of mice or rats may be inaccessible to the 2-D video tracking system if the camera shoots from the top of the arena. In addition, existing video monitoring systems generally do not correct for some physical errors or environmental changes, e.g., they do not address the measurement error associated with water refraction and reflection, which should be corrected for, when monitoring fish swimming motion.

In general, there has been an increase in demand for automatic phenotypic behavior monitoring systems in the past a few years, which can be utilized in various behavior tests of laboratory animals. Examples of automatic systems have been developed according to these needs include: photobeam cages, force plate actometers, and analog/digital video monitoring systems. See, e.g., the articles cited above. The application of these automatic monitoring systems has successfully solved most of the subjectiveness problems associated with the conventional methods of human observation, such as low accuracy, labor intensiveness, and the resultant data errors. Among these systems and methods, the use of a video camera as the motion sensor has provided the most powerful monitoring capabilities due to the high spatial resolution of the camera and its adeptness to various animal species and environment. However, many existing video systems are 2-D in nature and can only monitor the motion information along two translation axes and one rotation axis, i.e. three degrees of freedom (DOF) defining a planar motion. Consequently, the gathered time histories of animal motion parameters are incomplete when using these conventional 2-D video-tracking systems. Therefore, a more advanced video system that is able to truly monitor the motion-related behavior of laboratory animals in 3-D space is demanded.

Real-time 3-D systems have been described wherein two or more cameras are used to capture images. In addition, 3-D systems have been described that consist of a combination of a camera and two or more mirrored surfaces, resulting in non-conventional stereo pairs. See, Gluckman and Nayar, *A Real-Time Catadioptric Stereo System Using Planar Mirrors*, IUW, 1998; Lin, J. Yeh, M. Ouhyoung, *Extracting 3-D facial animation parameters from multiview video clips*, IEEE CGA, 22(6), 2002, 72-80; and J. Chraskova, et al., *An automatic 3-D tracking system with a PC and a single TV camera*, Journal of Neuroscience Methods, 88(1999), 195-200. The systems described by Nayar, Lin and Chraskova relate to the capture of a single stereo image. In their systems, however, systematic implementations of 3-D video tracking of animal motion are not adequately addressed, such as calibrating the system, dealing with measurement error and system noises induced by multiple media, tracking the motion of a single or multiple animals robustly without aliasing, and tracking multiple animals simultaneously without attaching visibly distinguishable tags. For example, although reflective mirror is employed in the 3-D animal tracking system described by Chraskova, the mirror is only set at approximate orientation and position while not further calibrated for its accurate geometric parameters. In their system implementations for tracking the swimming behavior of fish, the monitoring errors such as water refraction-induced distortion of stereo geometry is not corrected. In the system described by Chraskova, furthermore, a light emitting diode (LED) marker has to be carried by every animal being tracked, while multiple LED markers have to be activated in alternate frames (time-sharing regime) in the applications of monitoring multiple animals simultaneously. These requirements significantly increase both the technical challenge in the implementation of the behavioral experiments and the uncertainties in the behavior monitoring results.

Accordingly, there exists a need for improved systems and methods for 3-D monitoring and analyzing the motion behavior of one or more test animals.

SUMMARY OF THE INVENTION

The present invention relates to a system for 3-D monitoring and analysis of motion-related behavior of test subjects. The system comprises an actual camera, at least one virtual camera, and a computer. The computer is preferably connected to the actual camera and installed with software packages capable of capturing the stereo images associated with the 3-D motion-related behavior of test subjects as well as processing these acquired image frames for the 3-D motion parameters of the test subjects of interest. The system of the invention comprises of hardware and software components. The d hardware components preferably comprise a hardware setup or configuration, a hardware-based noise elimination component, an automatic calibration device component, and a lab animal container component. The software components preferably comprise a software-based noise elimination component, a basic calibration component, and extended calibration component, a linear epipolar structure derivation component, a non-linear epipolar structure derivation component, an image segmentation component, an image correspondence detection component, a 3-D motion tracking component, a software-based target identification and tagging component, a 3-D reconstruction component, and a data post-processing component.

In a particularly preferred embodiment, the actual camera is a digital video camera and the virtual camera is the reflection of the actual camera in a planar reflective mirror. Therefore, the system is a catadioptric stereo computer vision system.

BRIEF DESCRIPTION OF THE DRAWINGS

FIG. 29 is a table of exemplary fundamental kinematical attributes that can be extracted from the motion trajectories monitored by 2-D and 3-D video systems, where d, v, a stand for linear displacement, velocity and acceleration, while $\phi$, $\omega$, and $\alpha$ stand for angular displacement, velocity and acceleration, respectively. In a 2-D system, the coordinate system can only be transformed freely on the camera image plane with a set camera axis Z, while there is no restriction in coordinate transformation in the 3-D system.

FIG. 30 is a table of exemplary motion parameters in both time domain and frequency domain, which are used for further statistical analysis for behavior end-points. These series are derived automatically from the reconstructed 3-D motion trajectories by data post-processing component. In this table, {X, Y, Z} stands for any Cartesian coordinates in 3-D space, which can be attached or transformed according to different needs.

FIG. 31 is a table of the division of groups of Example 1 (alcohol addiction tests on goldfish), wherein the change of 3-D swimming locomotion of goldfish induced by adding ethanol into water is monitored and analyzed.

FIG. 32 is a table showing the one-way analysis of variance (ANOVA) results of the average distance-from-center, 3-D swimming speed, and 3-D turning speed in the alcohol addiction tests on goldfish of Example 1 a "*" denotes a significant difference in the associated motion parameter between the groups being compared.

FIG. 33 is a table showing the results from post-hoc mean comparison of the average distance-from-center in the alcohol addiction tests on goldfish of Example 1 a denotes a significant difference in the associated motion parameter between the groups being compared.

FIG. 34 is a table of the results from a post-hoc mean comparison of the average 3-D the alcohol addiction tests on goldfish of Example 1 a "*" denotes a significant difference in the associated motion parameter between the groups being compared.

FIG. 35 is a table of the results of a group-wised mean comparison of the up-and-down speed of a mouse head, from Example 2 (ethanol-induced behavior change of mice) a "*" denotes a significant difference between the two groups being compared.

FIG. 36 is a table of the results of group-wised mean comparison of the 3-D distance from trajectory center of a mouse head from Example 2 (ethanol-induced behavior change of mice) a "*" denotes a significant difference between the two groups being compared.

FIG. 37 is a table of the results of a group-wised mean comparison of the time percentage of rearing during monitoring process from Example 2 (ethanol-induced behavior change of mice) a "*" denotes a significant difference between the two groups being compared.

DESCRIPTION OF THE PREFERRED EMBODIMENTS

Figure 1:
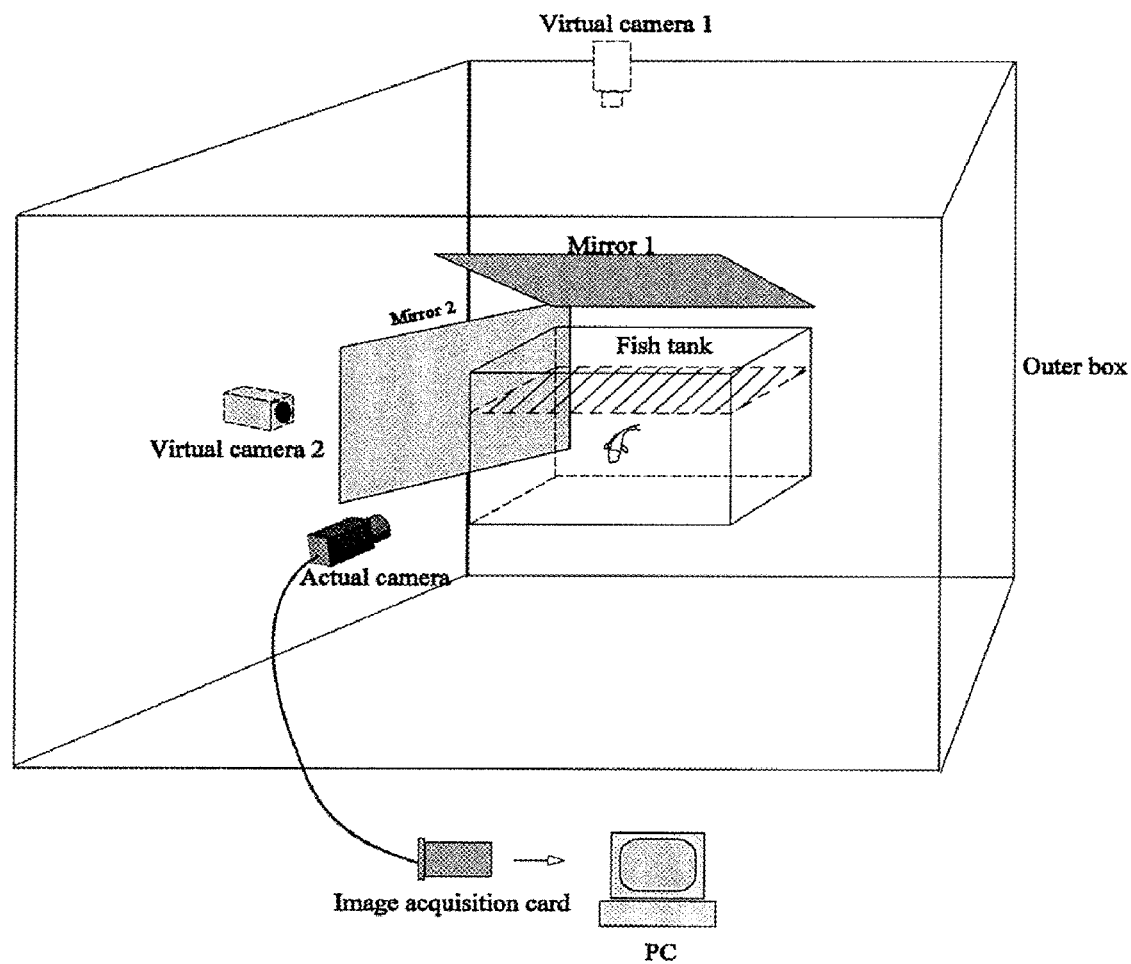
FIG. 1 is the schematic of an exemplary 3-D animal behavior monitoring system of the invention, in which the monitoring of the swimming behavior of fish is used as an example.

The system and methods of the present invention can automatically monitor the motion of one or more targets of interest (as referred to herein, a "target" is any test subject of interest, for example an experimental laboratory animal of interest or a feature point on the body of a laboratory animal of interest) in 3-D space and provide corresponding quantitative analyses of key motion parameters in 6 DOF. By using the stereo monitoring system of the invention, target motion is tracked and analyzed in an extended 3-D space containing at least six DOFs instead of in the 2-D space with only three DOFs of conventional 2-D video tracking systems. In a preferred embodiment, the system of the invention comprises an actual camera and at least one virtual camera. A stereo pair may be formed between any two of the cameras, and the system may comprise one or more stereo pairs. Actual cameras include, but are not limited to, a digital video camera, or an analog video camera with a frame grabber digitizer. Virtual cameras include, but are not limited to, the reflections of the actual camera in reflective planar mirrors, and synchronized cameras that are real cameras which are synchronized with the actual camera by software or customized hardware. In a preferred embodiment, the virtual camera is formed by reflecting the actual camera into a planar mirror. The use of planar mirrors eliminates the need for synchronization and provides the benefit of low system cost. In addition, space can be saved by employing planar mirrors for virtual cameras due to the reflective properties of mirrors. When the virtual cameras of the system are formed by reflecting the actual camera into mirrors, the system is a catadioptric stereo system.

In the case of using real cameras as virtual cameras, additional approaches are required to synchronize the actual and virtual cameras. Such synchronization is to ensure multiple cameras that form stereo pairs to grab the images of same targets at the same time. The cameras may output more than one image for every frame. In this case, more pixels might be effectively devoted to the images of the targets and the targets could be view more clearly. Computation time and memory cost may increase because multiple images have to be processed in order to reconstruct the 3-D positions of the targets.

In one embodiment the system of the present invention may comprise multiple cameras (including multiple real cameras and/or multiple virtual cameras), which can form two or more linearly independent views of a target being monitored (i.e., that each contain information which may not be present in the other). Preferably the cameras are distributed throughout space to cover multiple animals' 3-D activities.

In the implementation of the preferred embodiment, virtual cameras are obtained by reflecting the actual camera into the mirrors. In this embodiment, all the extrinsic parameters of the actual camera are mirrored as the extrinsic parameters of the corresponding virtual camera, while the intrinsic parameters of the corresponding virtual camera are kept identical to the actual one. The use of catadioptric stereo cameras is basically equivalent to capturing the images and the mirrored images of the targets simultaneously by a single real camera or multiple real cameras. However, the former method is more systematic to be implemented as a valid stereo system, and more readily to be breakdown for modulized organization.

The actual camera and virtual cameras are placed in an enclosed space and are configured to gaze at the targets of interest in linearly independent directions. Specially designed hardware components are employed to ensure that consistent image frames are acquired by the cameras during monitoring process, with minimum noise. Such hardware components comprise a geometric configuration of hardware parts (Is this defined anywhere?), a hardware-based noise elimination component, an automatic calibration device component, and a lab animal container component, which are further described below.

The actual camera is preferably connected to a computer (e.g. a personal computer ("PC")) through an embedded image acquisition card. In the computer, in-house developed software packages are installed for the purpose of the behavior monitoring and analysis. The software packages preferably include a software-based noise elimination component, a software-based calibration component, a synchronization component, an epipolar derivation component, an image segmentation component, an image correspondence detection component, a 3-D motion tracking component, a software-based target identification and tagging component, a 3-D reconstruction component, and a data post-processing component, which are further described below. These software components may perform such functions as adaptive background generation, image segmentation, foreground-image clustering, foreground-image correspondence detection, target identification and tagging, 3-D motion tracking, 3-D position reconstruction, smart target re-tagging, automatic measurement-error correction, trajectory-based kinematical analysis, and statistical analysis of the kinematical parameters describing the 3-D motion of targets. In a particularly preferred embodiment, the software comprises corresponding algorithms capable of analyzing video images and computing 3-D motion parameters of targets in real-time and/or from stored image sequences in an off-line mode.

The system can be configured to enable monitoring and analyzing of target behavior in terms of 3-D motion history, which is useful for studying phenotypic behavior of genetically altered laboratory animals, experimental animals with diseases that result in motor function degradation, and/or experimental animals of high through-put drug screening. In addition, the system can be similarly configured to adapt to various applications, such as animal psychology studies, physiology studies, neurological studies, and/or 3-D shape re-construction or morphing of the 3-D shape of a moving object.

The user of the system can create a new monitoring record for post-processing, which contains the 3-D trajectories of the targets of interest. The user can analyze the data by retracing the recorded motion history of the targets to produce a 3-D display or can analyze the data in text form. Specific features associated with one or more motion parameters can be extracted and analyzed independently from other motion data. Classification and statistical tests of the data can be accomplished with well-known techniques, such as ANOVA (which stands for analysis of variance) and MANOVA (which stands for multivariate analysis of variance).

System Setup

Figure 22:
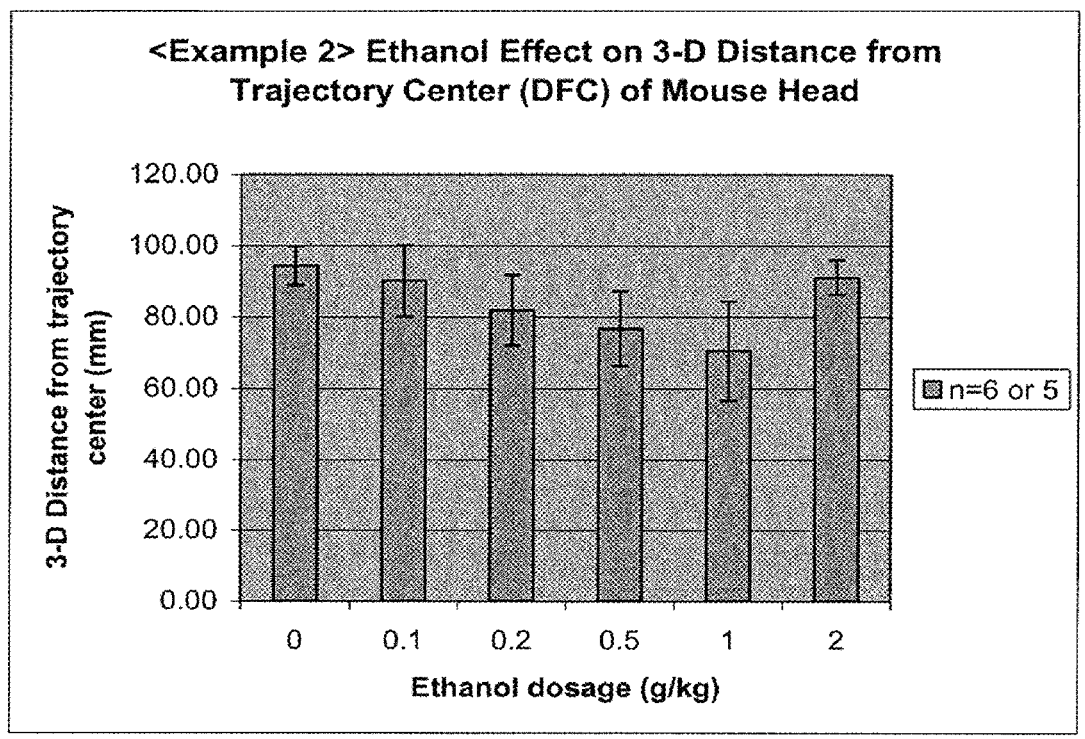
FIG. 22 shows the group means and standard deviations of the 3-D distance from trajectory center (DFC) of a mouse head, which is obtained from the experiments in example 2 (ethanol-induced behavior change of mice).

In a preferred embodiment illustrated in FIG. 1 and FIG. 22, the system includes an animal container (tank or cage) accommodating the targets, such as experimental animals, which serves as either an open field or a home cage/tank; an outer box acting as the environment noise shield, on which proper illumination sources are fixed, including ambient lights, UV lights, and/or backlights; one digital video camera shooting towards one transparent face of the tank, which serves as the actual camera; and one or several reflective planar mirrors, in which the images of the experimental animals can be seen by the actual camera. Virtual cameras are formed by reflecting the actual camera into each mirror. The actual and virtual cameras gaze at directions different from the axes of each other. The actual camera captures the video images of a space of interest in real time. The video images can be stored in a storage medium, or can be used to calculate the 3-D motion trajectories of the targets of interest and then disposed of. Calculating the motion trajectories in real time has several advantages: first, that the sampling frequency can be increased since no image sequence has to be saved to a computer hard disk, and second, that disk space can be saved, allowing for longer term monitoring.

As noted above, although a digital video camera is used as the actual camera in the preferred embodiment, other non-limiting actual camera examples include analog video cameras with frame grabber/digitizers, and combinations thereof. In addition to at least one actual camera, the preferred system also comprises at least one virtual camera. FIG. 1 illustrates a preferred embodiment having two virtual cameras, formed by reflective planar mirrors and the actual camera. Other examples of virtual cameras include synchronized cameras (which are real cameras that have been synchronized and may also be calibrated), networked cameras or reflective curved surfaces. Though, usually the hardware-based and the software-based calibration components in this embodiment need to be modified to fit other virtual camera options.

Figure 5:
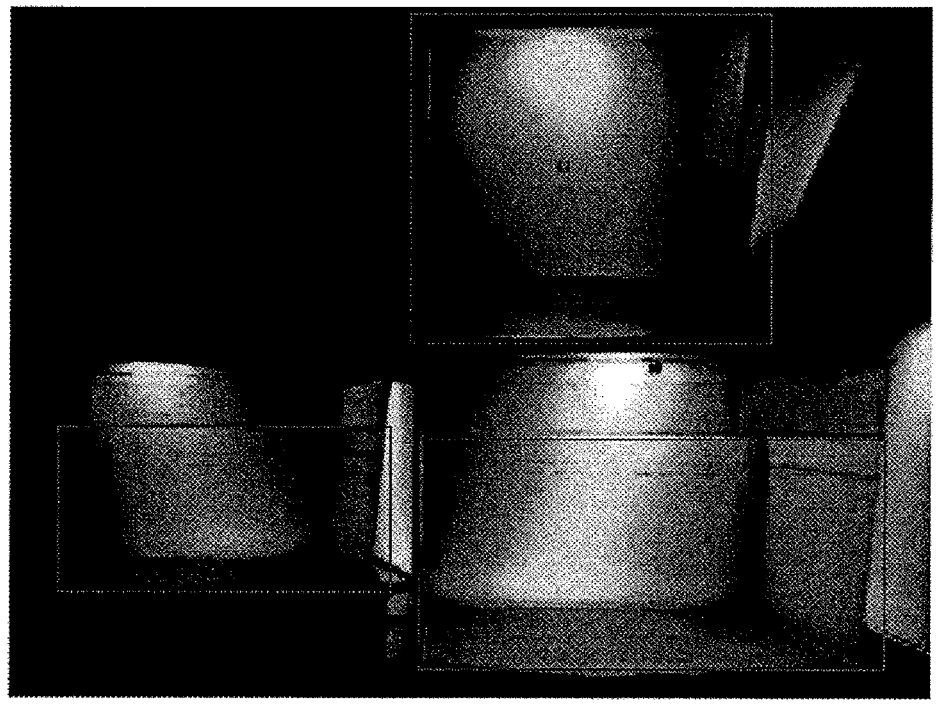
FIG. 5 shows an acquired stereo image of an empty fish tank. The three regions correspond to the viewing areas of actual and virtual cameras and are displayed in bounding boxes.

The image projected on the image plane of the actual camera may be comprised of multiple areas, including the area bounding the animal container (such as the mouse cage or fish tank), and the areas bounding the images of the animal container in the mirrors, as shown in FIG. 5. This is equivalent to acquiring the images of the targets by the actual and virtual cameras. By virtue of this configuration, multiple images of the moving target can be taken simultaneously from different 3-D viewpoints, which form stereo correspondence sets that can be used for reconstructing the spatial positions of the targets. In order to achieve appropriate fields of view (FOV) and the best image quality, translation and rotation mechanisms can be applied to the mirrors to enable them to translate and/or rotate freely in the space. The virtual cameras of the invention are particularly useful for synchronization between any pair of cameras, including actual cameras, virtual cameras, and combinations thereof. The image of the target itself and images of the target formed in the virtual cameras are captured by the actual camera, on a single image plane; and therefore, multiple actual cameras for capturing multiple images may be dispensed with. The use of a single image plane and a single actual camera greatly reduces the memory requirement, which makes image processing more efficient. The system may comprise as many virtual cameras as necessary to provide the desired views and data. The system of the invention is capable of providing detailed images of targets which can be acquired easily, in a cost-effective manner.

The actual camera is connected to a computer that preferably comprises stereo computer vision capabilities (i.e., includes software packages for stereo image processing and 3-D motion tracking). The image from the actual camera may be fed into the computer at a constant high frame rate (e.g. 15 frames per second (fps) in the preferred system) in a real time mode. The images can be stored in the hard disk for later reference/analyses or dumped immediately after calculating the motion trajectories and kinematical parameters associated with the targets of interests. Any known image processing software can be used, written in, for example, but not limited to, Visual C++, C#. NET, OpenGL on Windows XP platform, and other programming languages on other software development platforms.

Figure 2:
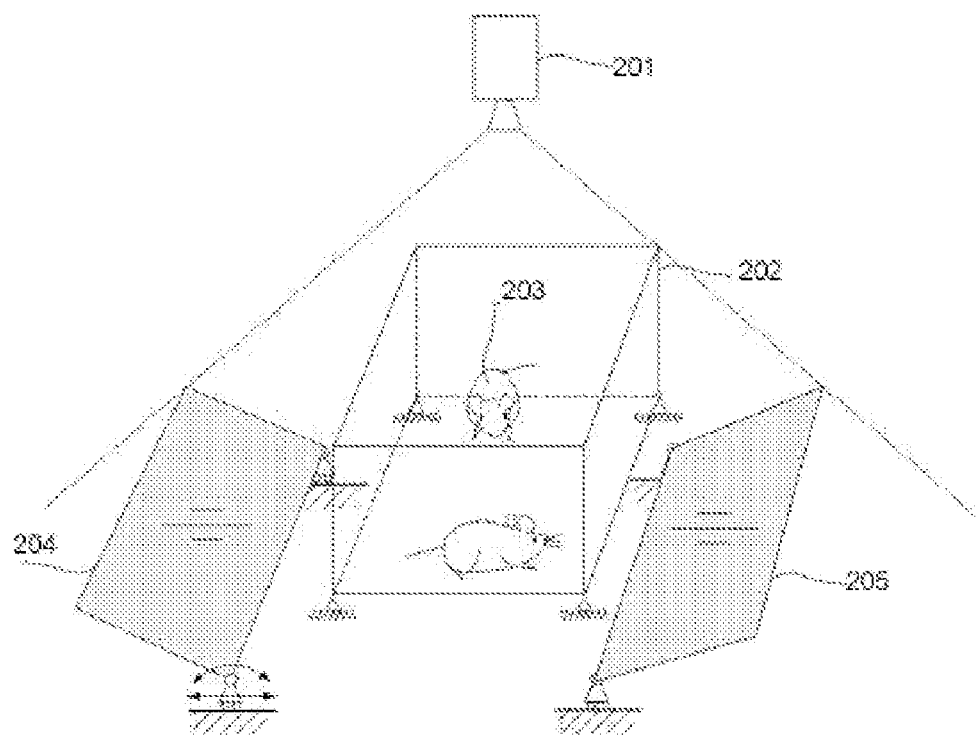
FIG. 2 is a schematic of an exemplary embodiment of the 3-D animal behavior monitoring system of the invention, which can be applied to monitor the locomotion activities, home cage activities, and footstep paths of mice or rats.

FIG. 2 illustrates another embodiment of a system of the invention in which the mirrors are placed in the desired positions and orientations to form the images of the feet of the monitored animals, which can be captured by the actual camera 201 without occlusion. Accordingly, the footpaths of the monitored animal(s) can be recorded or analyzed in real-time.

Removal of System Noise

System noise (such as inconsistent or time-varying background induced by the variation in ambient illuminating conditions, segmentation error caused by insufficient contrast between the foreground and the background in the acquired images, by the water disturbance when monitoring the swimming behavior of fish, or by the reflective images of the animals formed on the interfaces of different media, etc) brings forward significant challenges in monitoring processes because irrelevant regions may be mistaken as foreground images of the targets. The erroneous results could consequently lead to incorrect image correspondence, target identification and tagging, and errors in the reconstructed 3-D positions of the targets being tracked. Therefore, the preferred disclosed system may further comprise hardware-based and software-based noise elimination components. The hardware noise elimination components allow the system to avoid environmental noises induced by inconsistent illumination conditions and the monitoring noises induced by the formation of reflective images of the targets on the medium interferences. The software noise elimination components can update the image background adaptively to eliminate illumination noise and filter out falsely segmented target images by a variety of filters, including intensity filters, color space filters, and pixel size filters. The software noise elimination components further include the spatial consistency constraints imposed by epipolar geometry and the temporal consistency constraints imposed by 3-D Kalman filters. The segmented images corresponding to possible targets are eliminated as measurement noises if they do not satisfy both constraints simultaneously.

As a component for hardware noise elimination, the cameras and animal container are placed inside an enclosed space (outer box shown in FIG. 1) and sheltered from the environmental illumination conditions outside. Consistent light sources are included inside the outer box to provide consistent illumination of the test animals. By employing this hardware configuration, the environmental noise induced by change of illumination conditions can be effectively eliminated.

In one embodiment, the hardware noise elimination components also include the capability of image contrast enhancement. For example, the hardware-based noise elimination components may comprise a number of uniform white light sources, which are preferably placed opposite to the cameras (both actual and virtual), as shown in FIG. 5. Therefore, small disturbances in the lighting conditions become inconsequential in the consistency of image frames.

In addition, the hardware-based noise elimination components further comprise unique system setup and part configurations to avoid the formation of reflective images of targets on the medium interfaces. The two walls of the animal container facing the video camera and mirror 2 (see FIG. 1 and FIG. 5) are preferably clear and transparent. They serve as the observation windows for the actual camera and virtual camera 2, respectively, with their normals roughly coinciding with the axes of these two cameras. On the other hand, the inner surfaces of other three walls of the animal container (the two walls opposite to the observation windows and the wall on the bottom) are surface-machined to be rough until no reflective image would form on them. In one embodiment of monitoring the swimming motion of fish, these fogged panes are lit by the light sources as shown in FIG. 5 for contrast enhancement. In this embodiment, nearly saturated white color can be achieved as the background in the image. Foreground targets are thus stressed as dark regions.

In a preferred embodiment, for eliminating reflective images of targets on medium interfaces, the axis of the actual camera is on the plane of one monitoring window of the animal container and one mirror is configured such that the axis of a corresponding virtual camera is on the plane of another monitoring window. Accordingly, the system is configured with the observation window(s) being either parallel to the image plane of its associated camera or perpendicular to other cameras, to prevent the formation of reflective images of the targets on the observation windows. This may be achieved by manually or automatically adjusting the planar mirrors. To automatically adjust the mirrors for the optimum configurations of virtual cameras, an algorithm takes the projections of two monitoring windows of the container as input and accomplishes the adjustment by a step-wise rectification of the positions of the virtual cameras until the projection of the two monitoring windows is in the form as the above.

As a part of software noise elimination component, the background image, in which the targets reside in, can be adaptively updated when background subtraction is performed for target segmentation. The previous background image is replaced by an updated image whenever the noise level becomes larger than a set threshold in the previous background image. The ability of the software noise elimination component to be dynamically updated makes the monitoring more robust and adaptive in common lab lighting environments, under enhanced lighting conditions, or in a natural environment.

In another preferred embodiment when color space segmentation is performed for target segmentation, the color space attributes (such as hue, saturation and value) of the pixels in the acquired frame are filtered by color space filter. The pixels with color-space attributes outside the color space confined by set ranges of values are filtered out. The set ranges of color values correspond to the color attributes of the targets to be monitored.

The software-based noise elimination components further comprise a pixel intensity filter and a pixel size filter to eliminate erroneously segmented foreground images of targets. In a preferred embodiment by applying background subtraction for target segmentation, the pixel intensity filter works by removing the foreground image pixels with intensity value falling outside a set intensity range, which corresponds to the intensity of target images. After target segmentation through background subtraction or color segmentation, the pixels of the segmented foreground images of possible targets are clustered into markers. The marker pixel-size filter is then applied to these markers. Markers with pixel sizes falling outside the set size range of desired pixel number of target images are filtered out as measurement noise.

Calibration of the Stereo Pairs

Figure 3:
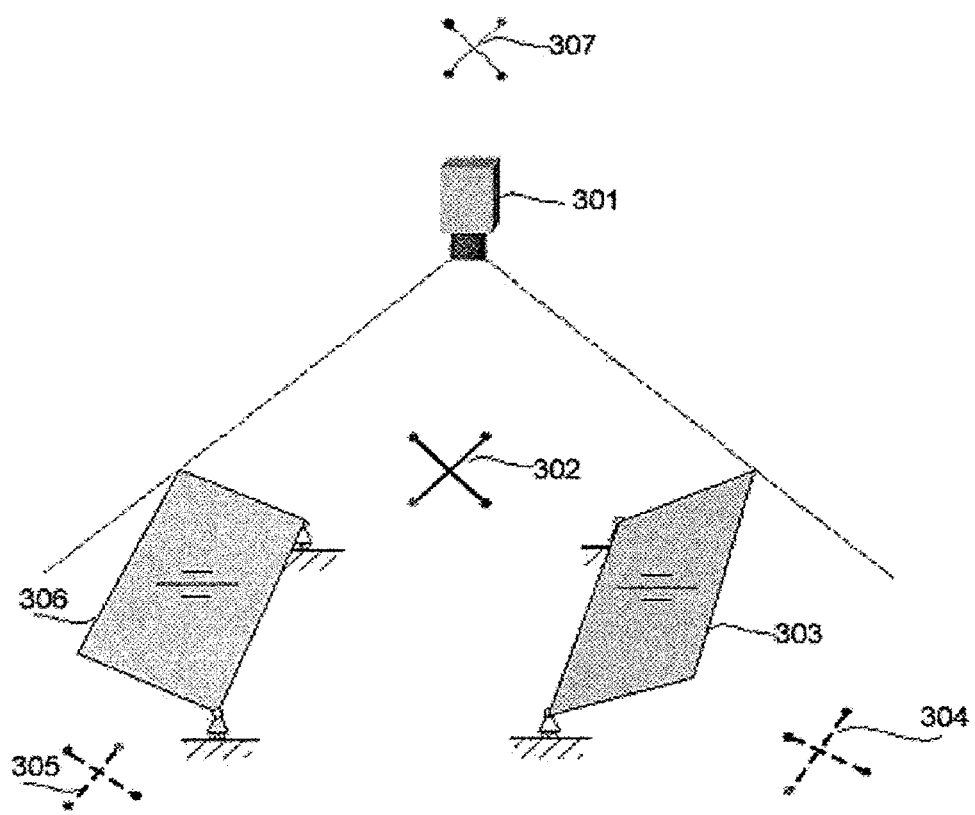
FIG. 3 shows an exemplary hardware-based calibration device component of the invention for the calibration of the stereo system of the invention, with a calibration pattern having multiple colored ends as visible indicators.

The system of the invention preferably comprises a hardware-based calibration component and a software-based calibration component. FIG. 3 illustrates an exemplary calibration component in which an auxiliary calibration apparatus 302 is captured by all the actual and virtual cameras. The images of the apparatus in the mirrors 304 and 305 are seen by the actual camera 301, as well as the image directly captured by the actual camera itself. A correspondence is established automatically among these images, from which the positions and orientations of the mirrors, the extrinsic parameters of the virtual cameras, and furthermore the epipolar structures of the stereo pairs can be obtained by stereopsis calibration process.

The data collection process for system calibration is as follows. A image containing multiple views of the animal container with the calibration apparatus put inside is compared to a image containing the same views of the animal container with no calibration apparatus putting in. This is achieved either by stressing the color information of the calibration apparatus then HSV (hue, saturation, value) segmenting which results in difference image with distinguished intensity and color, or by stressing the intensity information of the calibration apparatus only. The stressed pixels form several clusters, and the geometric centroids of these clusters are computed on the image plane with known correspondence, and later are used to solve the calibration equations for the positions and orientations of the mirrors.

Figure 4:
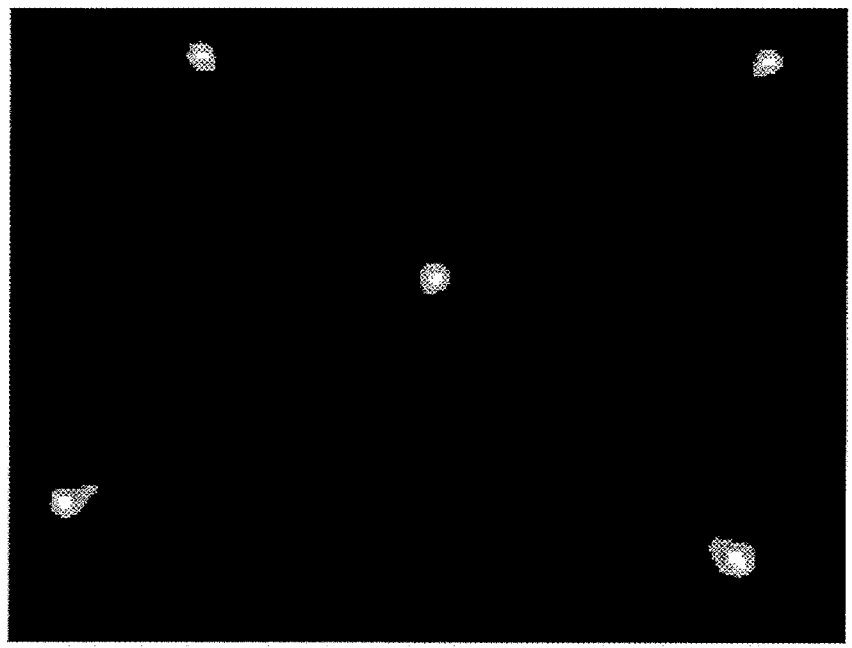
FIG. 4 shows an image of the automatic calibration pattern with multiple visible indicators in the form of high intensity light emitting diodes (LED), which is in the viewing area associated with the actual camera.

There are various embodiments of the hardware-based calibration components, including the calibration apparatus and of the patterns obtained therefrom. For example, an object with visible indicators such as colored ends as shown in FIG. 3, or several colored LEDs with certain on-and-off sequential orders as shown in FIG. 4, may be used. The hardware-based calibration components may further comprise a computer port and a cable connecting the computer port and the visible indicators, which are used to automatically turn the visible indicators on and off following a preferred sequence by sending out TTL pulses from the computer.

Preferred software calibration components include software for intrinsic parameter calibration of the actual camera, calibration of the mirror, calibration of the virtual cameras, and calibration for medium interfaces. In a preferred embodiment, these calibration steps are performed automatically. Although special software packages (the processing in which is described below) for calibration have been developed in a preferred embodiment, any general-purpose calibration software could be applied for intrinsic parameter calibration of the actual camera. The intrinsic parameters of the actual camera can be calibrated according to the standard camera calibration procedures using the hardware-based calibration components of the invention. Preferably, a basic calibration procedure including mirror calibration and virtual camera calibration, and an extended calibration procedure including the calibration of medium interfaces for the distortion of stereo geometry by water refraction, are achieved with a variety of software-based calibration components that applies the stepwise calibration methods described further below.

First, a software-based calibration component is capable of extracting the pixels corresponding to the visible indicators (such as LEDs or colored ends) on a calibration apparatus by differencing two or more images (between the background image and any other image with visible indicators on) to determine the correspondences among the images of indicators, which are taken by all the cameras. Such correspondence can be set, for example, through automatic HSV segmentation, through automatic intensity segmentation, or through manual selection.

In a preferred embodiment, the software-based calibration component for the geometric attributes of the mirrors achieves the mirror calibration utilizing the following calibration method.

A planar mirror is parameterized by four parameters [u, d], where u is a normalized 3-D vector indicating the orientation (normal) of the mirror plane, and d is distance from the mirror plane to the origin of the camera coordinates associated with the actual camera or the center-of-projection COP $(0,0,0)^T$ of the actual camera. Therefore, any point p on the mirror plane would satisfy:

$$p \cdot u = d \quad (1)$$

The orientation vector u satisfies:

$$Tu = 0 \quad (2)$$

Where $$T = \begin{bmatrix} -f(C_y^1 - M_y^1) & -f(C_x^1 - M_x^1) & C_x^1 M_y^1 - C_y^1 M_x^1 \\ -f(C_y^2 - M_y^2) & -f(C_x^2 - M_x^2) & C_x^2 M_y^2 - C_y^2 M_x^2 \\ \vdots & \vdots & \vdots \\ -f(C_y^{n-1} - M_y^{n-1}) & -f(C_x^{n-1} - M_x^{n-1}) & C_x^{n-1} M_y^{n-1} - C_y^{n-1} M_x^{n-1} \\ -f(C_y^n - M_y^n) & -f(C_x^n - M_x^n) & C_x^n M_y^n - C_y^n M_x^n \end{bmatrix}$$

Here $(C^i, M^i)$ are corresponding pixel centroids of the images of the visible indicators in the region of the actual camera $(C^i)$ and in the region of the mirror $(M^i)$, respectively; subscriptions stand for the image coordinates of the pixel centroids, and f is the focal length of the actual camera. Afterwards, the normal u can be computed as the eigenvector corresponding to the smallest eigenvalue of $T^T T$ via single value decomposition (SVD) (See, Lin, J. Yeh, M. Ouhyoung, *Extracting 3-D facial animation parameters from multiview video clips*, IEEE CGA, 22(6), 2002).

Figure 6:
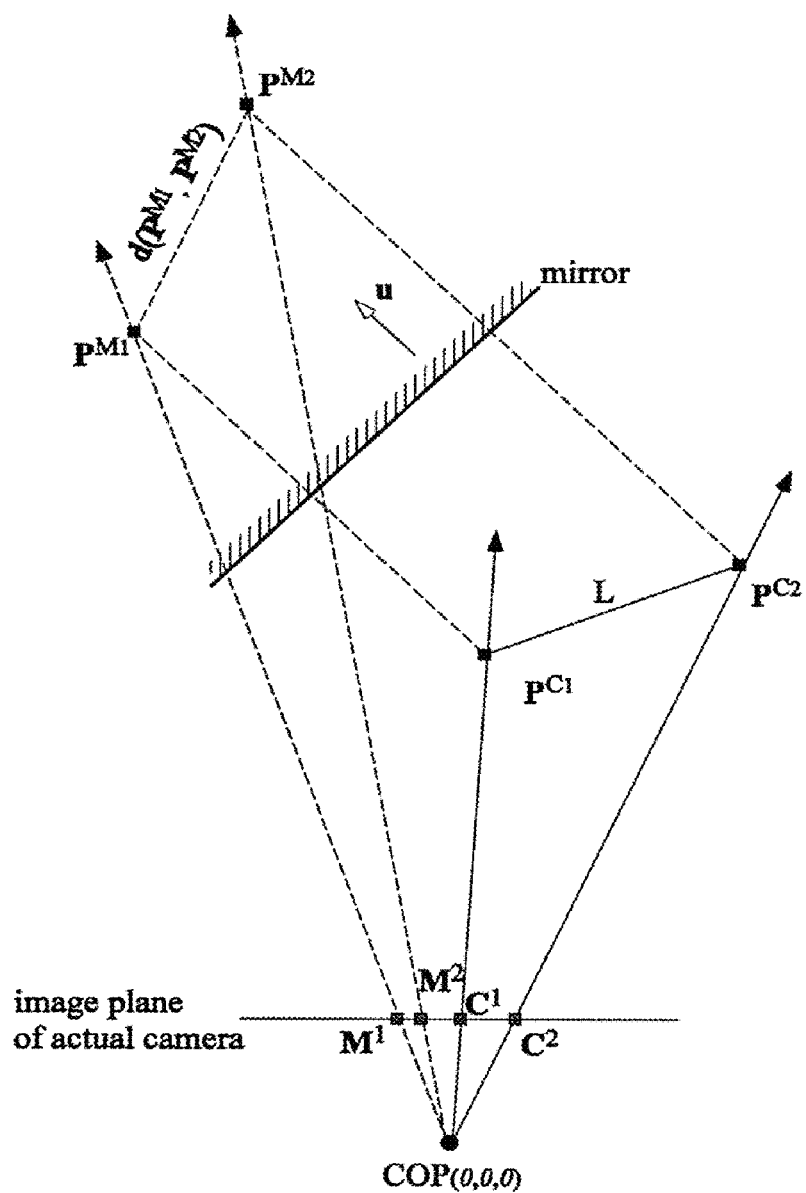
FIG. 6 illustrates the calculation method for mirror position which is calculated from the corresponding images of visible indicator sets and the obtained normal of the mirror plane.

To calculate the distance d from the COP of actual camera to the mirror plane, a known length L between two visible indicators ($P^{C1}$ and $P^{C2}$) on the calibration pattern is required. If the projections of these two indicators in the image region associated with the actual camera are $C^1$ and $C^2$ and their correspondences in the mirror region are $M^1$ and $M^2$. As shown in FIG. 6, the following parametric equations hold:

$$P^{C1} = t^{C1}(C_x^1, C_y^1, f)^T$$

$$P^{C2} = t^{C2}(C_x^2, C_y^2, f)^T$$

$$P^{M1} = t^{M1}(M_x^1, M_y^1, f)^T$$

$$P^{M2} = t^{M2}(M_x^2, M_y^2, f)^T$$

Here t is the parametric representation of a ray from COP (0,0,0). Since these four parameters describing the four sighting rays are correlated, a binary search can be done on the space of $t^{C1}$ based on the reflective properties of a mirror, as the following. We first compute $t^{C2}$ by $\|P^{C1} - P^{C2}\| = L$ at the current iteration value of $t^{C1}$. Afterwards both $P^{C1}$ and $P^{C2}$ are projected on the sighting rays associated with $M^1$ and $M^2$ along the normal orientation u of the mirror plane, and resulting in two projects $P^{M1}$ and $P^{M2}$ shown in FIG. 6. After computing $t^{M1}$ and $t^{M2}$ via the line intersection, the distance between the two projects $P^{M1}$ and $P^{M2}$ is calculated as $d(P^{M1}, P^{M2}) = \|P^{M2} - P^{M1}\|$. The recursion process terminates when $\|d(P^{M1}, P^{M2}) - L\| < \epsilon$, which is controlled by a single tolerance threshold $\epsilon$. The distance d from the COP (0, 0, 0) to the mirror plane is uniquely determined with known $P^{C1}$, $P^{C2}$, $P^{M1}$, and $P^{M2}$. Finally, a least-square solution is obtained within the calculated d values since multiple visible indicators are used for mirror calibration.

Once mirror calibration is completed, a software-based calibration component derives the extrinsic parameters (such as the location of the center of projection and the camera axis) of the virtual cameras automatically. The extrinsic parameters of the virtual camera are obtained by reflecting the corresponding extrinsic parameters of the actual camera according to the mirror associated with the virtual camera. In a preferred embodiment, all the geometric operations such as reflective mirroring are performed in the Cartesian coordinates associated with the actual camera. Therefore, the extrinsic parameters of the actual camera are known.

In a preferred embodiment, a software-based calibration component is applied for the calibration of the extrinsic parameters of the stereo pairs. A stereo pair may comprise a actual camera and a virtual camera or two virtual cameras. As described before, computer-controlled visible indicators may be placed in the animal container and turned on one by one through sending out TTL pulse signals via the computer parallel port. This introduces massive correspondences. The epipole induced by an actual camera and a virtual camera is therefore computed by the software-based calibration component as the intersection of the lines connecting the corresponding images of the indicators in the associated two views. The epipoles induced by two virtual cameras is computed via an optimization process such that the following error function is minimized.

$$E(e_0, e_1) = \sum_i \|((M_0^i \times e_0) \times m - (M_1^i \times e_1) \times m)\|$$

Figure 7:
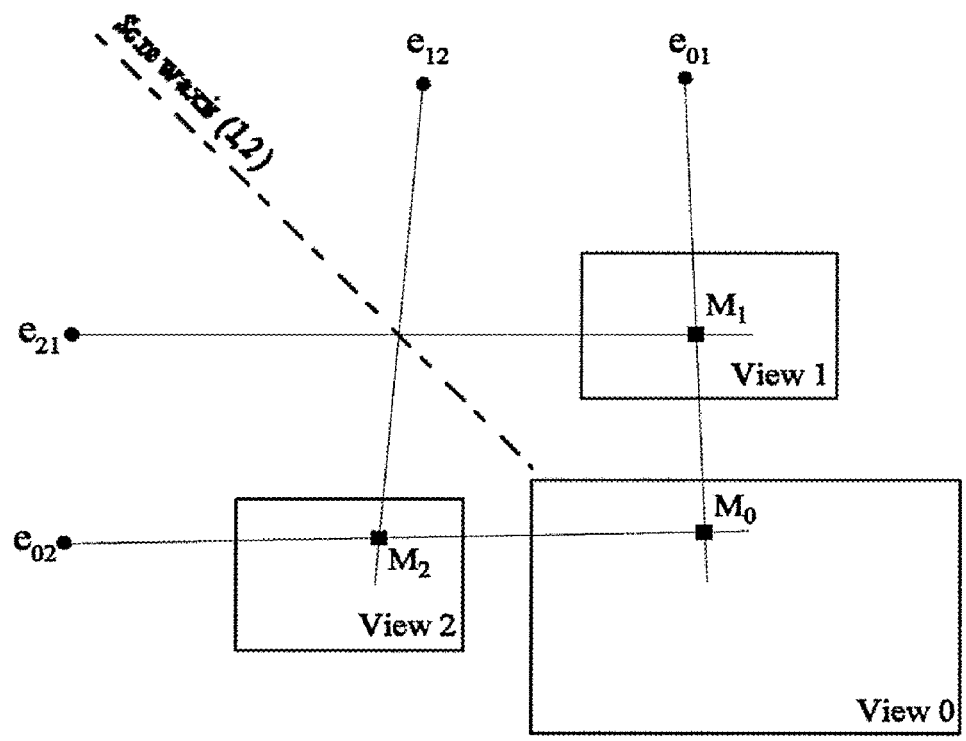
FIG. 7 shows an exemplary of epipolar structure of the invention formed by the actual camera 0 and two virtual cameras 1 and 2 as shown in FIG. 1, where $e_{ij}$ denotes the epipoles formed by cameras i and j, and $M_i$ stands for the corresponding image of a visible indicator in view i.

Here $(e_0, e_1)$ are the epipoles to be computed through a iteration process, m is the projection of the screw axis formed by projecting the intersection line of the image planes of the two virtual cameras onto the image plane of the actual camera, $(M_0, M_1)$ are the corresponding images in the regions of virtual cameras 0 and 1 of a same visible indicator, and i is the index of the visible indicator. The physical meaning of the above error function is that the epipolar line connecting $e_0$ and $M_0$ should intersect the epipolar line connecting $e_1$ and $M_1$ on the projection of the screw axis of the two virtual cameras, m, when the error function is approaching zero (See, e.g., J. Gluckman, et al, *A real-time catadioptric stereo system using planar mirrors*, Proceedings of Image Understanding Workshop, (1998)). FIG. 7 shows an example of the epipolar geometry of the stereo system shown in FIG. 1, which is calibrated out by the software-based calibration component for the extrinsic parameters of stereo pairs.

The basic calibration procedure discussed above is only valid in deriving the epipolar geometry when light travels in a single media (such as in the air when monitoring rodent animals). In the case of monitoring motion-related behavior of aquatic animals, epipolar structures obtained by the basic calibration method disclosed above may not be enough due to the light refraction at the interface between water and air. In this case, part of the epipolar lines may become curved and the projective relation between straight epipolar lines may not hold any longer. In order to adjust the stereopsis geometry and identify the associated image correspondence as a sighting ray of travels through different media, extended calibration is required to accommodate light refraction. The new epipolar structure having light passing through two different media is calibrated by using a software-based calibration component containing extended calibration methods of the invention. This extended calibration method is preferably as follows.

In the case of monitoring the behavior of aquatic animals, the tank is filled with water, thus introducing refraction of camera sighting rays. Consequently, the system should be calibrated in two consecutive steps: (1) basic calibration, in which the conventional epipolar structure of the stereo pairs are calibrated and derived following the procedure described before; (2) extended calibration, in which the medium interfaces that sighting rays may pass are calibrated for their locations and orientations. The extended calibration results in the detection of the distorted epipolar curves corresponding to the refracted sigh rays through multiple media. During the process, a target marker in a region will be projected into a 3-D line segment in the animal container. And this line segment will be projected back onto another region as the epipolar curve. Then during correspondence detection process, target markers passed through by an epipolar curve are deemed to be the corresponding ones that satisfy the epipolar constraint. Therefore, the epipolar structure is not linear anymore if multiple media present in the paths of camera sighting rays.

In the extended calibration process, the exact locations and orientations of the medium interfaces where refraction occurs need to be calibrated out. The extended calibration is based on ray tracing method. The procedure is composed of two sets of computations as forward and backward refractions.

According to the system geometry as well as the derived epipolar structure from basic calibration, initial guesses can be made for the parameters of the interfaces. These parameters include the normal $u_i$ as well as the distance from the COP of video camera, $d_i$, of the two observation windows and the water surface in the tank. Here i ($i \leq 3$) stands for the index of these media interfaces.

Figure 8:
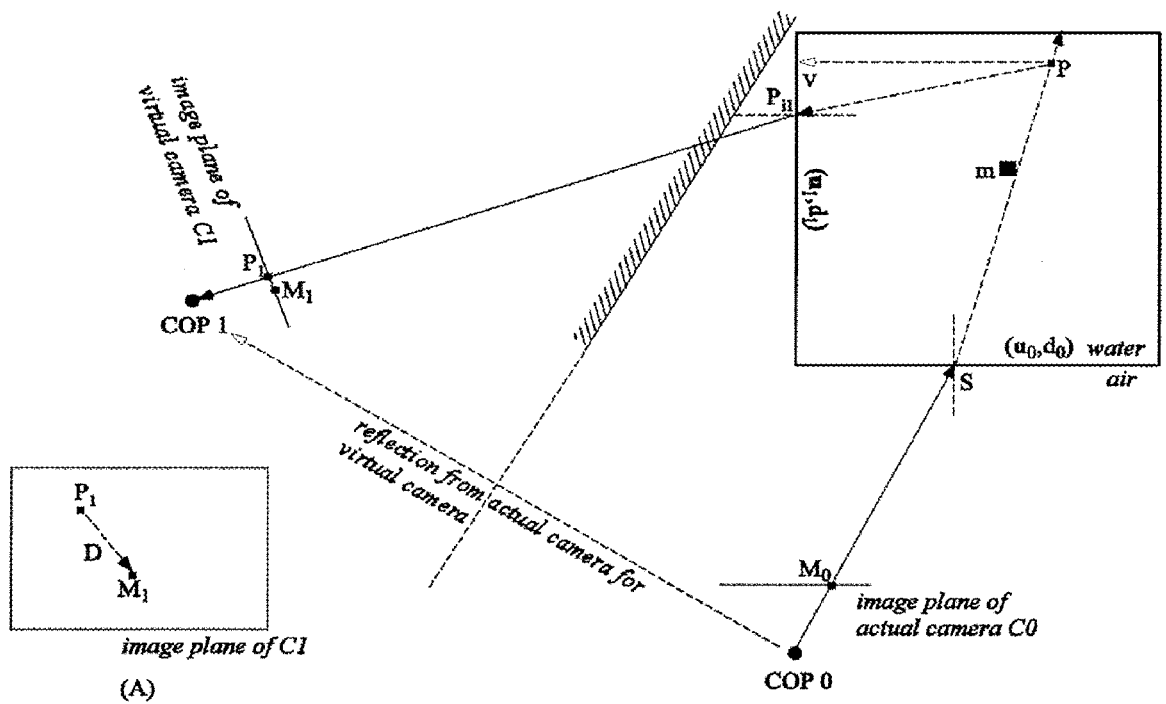
FIG. 8 illustrates the forward and backward refraction process by employing ray-tracing method. This process is applied in extended system calibration, correspondence detection, and 3-D reconstruction when monitoring aquatic animals.

Suppose a stereo pair is composed of two cameras $C_0$ and $C_1$, as illustrated in FIG. 8, where $C_0$ is the actual camera and $C_1$ is a virtual camera obtained from reflecting the actual camera $C_0$ regarding mirror 1. The forward refraction starts by shooting a sighting ray from $COP_0$ towards the image $M_0$ of a visible indicator m (the 3-D position of the indicator is unknown), which is on the image plane of $C_0$. The sighting ray $COP_0 M_0$ is refracted on a point S on interface $(u_0, d_0)$. By neglecting the thickness of all tank walls due to their relatively small dimensions (approximately 2.5 mm thick), the refracted ray SP (P is any 3-D point on the refracted ray) can be computed following Snell's law with known refractive indices of air and water. Backward refraction is then carried out to find the refractorily projected image $P_1$ of point P on the image plane of $C_1$, which is supposed to be the corresponding image of $M_0$ in $C_1$ provided the parameters of the medium interfaces are accurate thus P is the actual location of indicator m. Letting $P_{i1}$ denote the refraction point of P on interface $(u_1, d_1)$, $P_1$ is the intersection point of the image plane of $C_1$ and refracted ray of ray $PP_{i1}$. Therefore, the task remaining is to find the refraction point $P_{i1}$, on $(u_1, d_1)$. The refraction point $P_{i1}$ is found by performing a binary search on the intersection line between interface plane $(u_1, d_1)$ and the plane determined by P, the projection of P on $(u_1, d_1)$ (denoted by V), and $COP_1$. In this step, the distance between $COP_1$ and the refracted ray of $PP_{i1}$ is used to guide the search until the refracted ray of $PP_{i1}$ passes exactly through $COP_1$.

By placing the calibration pattern in water, a set of correspondences $<M_0, M_1>_i$ can be obtained, where i stands for the $i^{th}$ indicator. After forward and backward refractions on every $M_{0i}$, a set of $P_{1i}$ can be computed following the methods described above. Afterwards, the following error function is minimized to simultaneously calibrate the parameters of the two interface planes $$E(u_0, d_0, u_1, d_1) = \sum_{i=1}^{5} \|M_{1i} - P_{1i}\|$$

The above error function depends on all the parameters of both interface planes. The optimization process is carried out in an alternate manner until sufficient convergence is met. Newton method is employed in the iteration process to find the convergence point efficiently.

In the implementation of the extended calibration method, virtual cameras are obtained by reflecting the actual camera regarding the mirrors as shown in FIG. 8. As mentioned earlier, this implementation is equivalent to viewing the images of the targets themselves as well as their mirrored images of the targets simultaneously by the actual camera only.

Target Segmentation through Background Subtraction and Color Space Segmentation

In one embodiment, off-line system calibration is performed through the calibration components before the animal motion tracking starts, following the basic calibration procedure then optionally the extended calibration procedure described above. After off-line calibration is completed, the system can be switched into on-line tracking mode wherein video images are obtained and fed into the computer with a constant frame rate.

In the preferred embodiment of the invention, target segmentation is carried out by a software-based target segmentation component. The target segmentation component separates the foreground images associated with the targets from the background image through two methods, namely background subtraction and color space segmentation. In the preferred embodiments, the former is employed in the tracking of aquatic animals, while the latter is applied in tracking the feature points on rodent animals. However, these two methods can be applied in tracking all types of animals, either separately or as a combination thereof.

In tracking the 3-D motion of aquatic animals, the system of the present invention preferably generates a background image before the tracking process begins. Background generation may be accomplished by either taking a background image of the animal container without target inside (as shown in FIG. 5), or by eliminating the pixels associated with the moving animals by differencing multiple frames, and then averaging the color values of these frames to obtain an original background image. During the on-line tracking mode, a software-based dynamic background generation component can also generate an updated background image dynamically. This is particularly desired if variations occur in the background. In this embodiment, a threshold may be set for a desired acceptable amount of variation in the current background image. When the variation exceeds that preset threshold, a new background image can be dynamically determined. The criterion of updating the background image is as the following:

$$\|I_t - I_0\| \geq (1+\tau)\|I_1 - I_0\|$$

Where $I_t$ and $I_1$ are the frames acquired at time t and the first frame when the tracking process starts (or the first frame acquired after background re-generation), respectively; $I_0$ is the current background image, which is either generated before the tracking process, or re-generated in the middle of the tracking process; and $\tau$ is the tolerance. In one embodiment, the threshold is preset to be 5% for every pixel on the image. Accordingly, if the total variation for the new image is larger than 5% from the original, the images are considered different enough to be re-calculated.

Target segmentation may be achieved by background subtraction or color space segmentation, or the combination thereof. The target segmentation from background subtraction works by obtaining the foreground images through differencing the current frame with the current background image, and then clustering the pixels in the foreground images as the marker images of the targets. In the color space segmentation, the segmentation of target images is achieved by selecting the image pixels with their color space attributes (HSV or RGB) falling inside set ranges of desired color space values for foreground images. These foreground pixels are then clustered into markers.

Target segmentation is performed for all images obtained from the actual and virtual cameras on a single image plane. In the software-based target segmentation component, the following clustering algorithm is applied on the segmented foreground images. The initially segmented foreground images are composed of scattered pixels obtained by background subtraction or color segmentation. First a foreground image is taken as input. The image is then scanned by a intensity filter and/or a color space filter to obtain a pixel that satisfies a set of threshold values. When such a pixel is found, searching is carried out to tell if any neighboring pixels of the same sort can be found. If neighboring pixels are found, they are grouped together as a marker. Otherwise the pixel based on which the searching is carried out is discarded. If a marker is formed, the image attributes of this marker is calculated by averaging the pixel groups in this marker, and then this marker is segmented as a marker representing a possible target image. This procedure continues until all possible markers on the foreground image are found.

In the preferred embodiment, all the markers obtained by segmentation and clustering are then tested by a marker-size filter. Those markers with their sizes falling outside a set size range are disposed thereof as measurement noises.

Correspondence Detection by Epipolar Constraints

In the preferred embodiment of the invention, the epipolar constraints are obtained by the derived epipolar structure, which is calibrated by software-based calibration components. In a preferred embodiment, at least two epipolar structures exist in the system wherein the stereo geometry is undistorted. First, the epipolar structure between a stereo pair comprising the actual camera and a virtual camera, or between one target marker in the region of an actual camera and another marker of the same target in the region of a virtual camera; Second, the epipolar structure between two virtual cameras, or between target markers in the region of two virtual cameras. For the first epipolar structure, the software-based epipolar derivation component is capable of computing the epipole e through basic calibration process described before. The corresponding marker set in the actual camera region and in the virtual camera region should satisfy the following epipolar constraint:

$$(C \times M) \cdot e = 0$$

Here C and M stand for the two markers, in the region of the actual camera and the virtual camera, respectively. The physical meaning of the above epipolar constraint is that the line connecting the corresponding markers C and M should pass through epipole e. For the second epipolar structure between two virtual cameras, two epipoles $e_1$ and $e_2$ can be calibrated out by the epipolar derivation component by the basic calibration process described before. The corresponding marker set $M_1$ in the region of virtual camera 1 and $M_2$ in the region of virtual camera 2 satisfies the following epipolar constraint. The physical meaning of this epipolar constraint is that the intersection point of the line connecting $M_1$ and $e_1$ and the line connecting $M_2$ and $e_2$ is located on the projection of the screw axis, m.

$$((M_1 \times e_1) \times (M_2 \times e_2)) \cdot m = 0$$

In the case of monitoring the behavior of aquatic animals, the above traditional epipolar structure becomes insufficient in finding corresponding markers. Consequently, a different scheme is used to find the corresponding markers by using epipolar curve. Such epipolar curves are nothing but the projections of the refracted sighting rays on the image planes of a stereo pair, which are corresponding. As mentioned in the extended calibration process, ray tracing method is used in the detection of such epipolar curve, as the following. Given a marker $M_0$ in a region, we first project it back in the 3-D space as a sighting ray. Then we obtain the refracted ray segment inside the animal container. We break this refracted ray into small line segments. Consequently, we have several end points (the ends of these small line segments) along the refracted ray. By projecting these points to another region via refraction, we have a piecewise linear epipolar curve in that region. And the corresponding marker $M_1$ will be passed through by the epipolar curve.

Again, two kinds of refractions are involved in the derivation of the epipolar curve so that the corresponding marker set can be detected through the curved epipolar constraint: forward refraction and backward refraction. Forward refraction starts from a target marker and the backward refraction starts from a 3-D point on the refracted sighting ray associated with this marker. The relation between the rays before and after refraction on a medium interface can be described as the following according to Snell's law:

$$\frac{\sin\theta_0}{\sin\theta_1} = \frac{\lambda_0}{\lambda_1}$$

where $\theta_0$ and $\theta_1$ represent the angle between the incident and refracted rays and the interface normal and $\lambda_0$ and $\lambda_1$ are the refractive indices of the two media such as air and water. The procedure of the forward and backward refraction is similar as described in the extended calibration procedure (calibration of the stereo pairs).

With slight modification, the ray tracing method used in the corresponding detection and the derivation of refracted epipolar structure can also be readily applied for the reconstruction of the 3-D positions of targets.

Target Tracking, Identification, Tagging

One embodiment of the present system includes a software-based target 3-D motion-tracking component and a target identification/tagging component.

In a preferred embodiment, the software-based 3-D motion-tracking component comprises two types of consistency constraints, including the spatial consistency between different views; and temporal consistency over image sequence. These two sets of constraints are dynamically assigned with adaptive weights and are imposed concurrently during the whole monitoring process.

The constraints for spatial consistency work as the followings. When markers correspond to possible targets are obtained through segmentation and clustering, the correspondences between them are identified. The detection of such correspondences is realized by the generation of Geometric Compliant Correspondence Sets (GCCS) interconnecting the corresponding markers in different views. For every frame, the derivation of GCCS is guided by the conventional epipolar geometry when no refraction occurs, or by the nonlinear epipolar curve constraints when sighting rays pass through more than one medium. The spatial consistency is enforced by the detection of such GCCS on a per frame basis, which is time-irrelevant.

The constraints for temporal consistency work as the followings. A linear 3-D Kalman filter is designed to predict the current 3-D locations of the targets from the reconstructed locations and velocities of these targets in the previous frame. In the 3-D Kalman predictor, a state vector $x_i(t) = \{p_{xi}(t)\ p_{yi}(t)\ p_{zi}(t)\ v_{xi}(t)\ v_{yi}(t)\ v_{zi}(t)\}^T$ is kept updated over frame sequence for the 3-D location $p_i(t)$ and velocity $v_i(t)$ of the $i^{th}$ target. For frame t+1, the prediction of system state $\hat{x}_i(t+1)$ is made based on the state vector $x_i(t)$ in frame t:

$$\hat{x}(t+1) = \Phi x_i(t)$$

Here $\Phi$ is a constant state transition matrix. In our system, a 3D linear system is employed to predict the new state, as described in the following equations.

$$p_i(t+1) = p_i(t) + v_i(t)$$

$$v_i(t+1) = v_i(t)$$

The state transition matrix is as the following.

$$\Phi = \begin{bmatrix} 1 & 0 & 0 & 1 & 0 & 0 \\ 0 & 1 & 0 & 0 & 1 & 0 \\ 0 & 0 & 1 & 0 & 0 & 1 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

Together with the estimation of the 3-D locations of the target at frame t+1, a predicted state covariance matrix $P_i(t+1|t)$ can also be obtained from the Kalman predictor. Therefore, the 2-D projections of the estimated 3-D locations are computed through a backward refraction procedure, while the largest eigenvalues of matrices $P_i(t+1|t)$ are also computed and projected as the radiuses of the search regions encircling all the projected 2-D markers of the targets.

In a particular embodiment, the target identification/tagging component is an energy function, which operates preferably according to the principle of minimum energy. The energy function takes the segmented foreground markers of the tracked targets as input. In a particularly preferred embodiment, the energy function combines two main parameters together for target identification. These two parameters are obtained by the 3-D motion tracking component, including, spatial consistency comprising a GCCS detected by a variety of epipolar constraints, and temporal consistency comprising multiple 3-D linear Kalman-filter predictions with inherited target tags. In order to identify targets and assign proper tags to them on a stepwise basis, iteration is applied through all allowable permutations to find all energy values for all the marker pairs. The pair with the minimum of the energy is considered to be the correct motion pair inheriting the target tag from the previous frame.

As one of the energy parameter, spatial consistency employs epipolar constraints obtained by epipolar geometry derivation component. These constraints may follow traditional linear epipolar geometry obtained through basic calibration when single medium presents, or follow adjusted nonlinear epipolar structure obtained through extended calibration as light refraction occurs. The spatial consistency values are tested between possible corresponding markers to yield GCCS, for example, the value is 0 if the markers do not lye on the epipolar line or curve, which means that the spatial constraint is not met by the markers. The value is 1 if the markers perfectly lye on the epipolar line, which means that the spatial constraint is met by the markers. Such spatial consistency value is between 0-1 based on the alignment between markers.

As another energy parameter, temporal consistency employs all the 3-D linear Kalman predictors for all the targets being tracked. The targets are identified by the target identification component, which is based on the minimization of energy function by combining the spatial consistency and temporal consistency together. Such overall tracking consistency is mainly achieved by minimizing the energy function shown as the following. Suppose the set of Kalman filter predictions (with inherited tags) is denoted by N and the detected GCCS is denoted by M, with n tags and m sets of correspondences, respectively (m≧n due to possible noise), the energy function is:

$$E(N, M) = \sum_{i,j=1}^{n,m} \sum_{v=1}^{R} (M_{vj} - N_{vi})$$

Here i,j and v stand for the $i^{th}$ tag, the $j^{th}$ correspondence of GCCS, and the $v^{th}$ view, respectively. To find the minimum of the energy function, literally n×m iterations are required with high computational cost. However, the search tree can be heavily pruned by confining the iterations to the GCCS in the predicted search regions. Both the state vector and the state covariance matrices of the 3-D Kalman filters are updated through Kalman correctors after the tags are correctly assigned to the GCCS.

It should be noted however that physical target tagging is not required. The system of the present invention is capable of intelligent identification of the three-dimensional movement of multiple targets using algorithms based on spatial consistency and temporal consistency. As used herein, "spatial consistency" means the tendency of the target markers satisfying the epipolar constraints of the stereo system. As used herein, "temporal consistency" means the tendency of the image associated with a target to stay close with the previous image of the same target in a short time. The system of the present invention does not require that the animals be tagged or injected with a tracking device, unless special points or feature points are of interest, which are small potions on the animal bodies.

Object Re-Identification After Visual Collision

The present invention may further comprise a software-based re-tagging component for target re-identification. As two or more animals or feature points are close enough during a certain time span, their projected images may merge together in all views. In this case, the robustness of Kalman filters as temporal trackers would degrade, which usually results in tagging ambiguity as the paths of these animals or feature points split out after the time span. This is because there is more than one tag available for each target to inherit at the moment of splitting. The re-tagging component is useful where two or more moving targets, such as zebra fish, are close to each other or make physical contact, such that their tags overlap, i.e., their current 3-D positions appear identical. The re-tagging component of the invention is capable of re-assigning the tags of the two or more targets after near or actual collisions.

Figure 10:
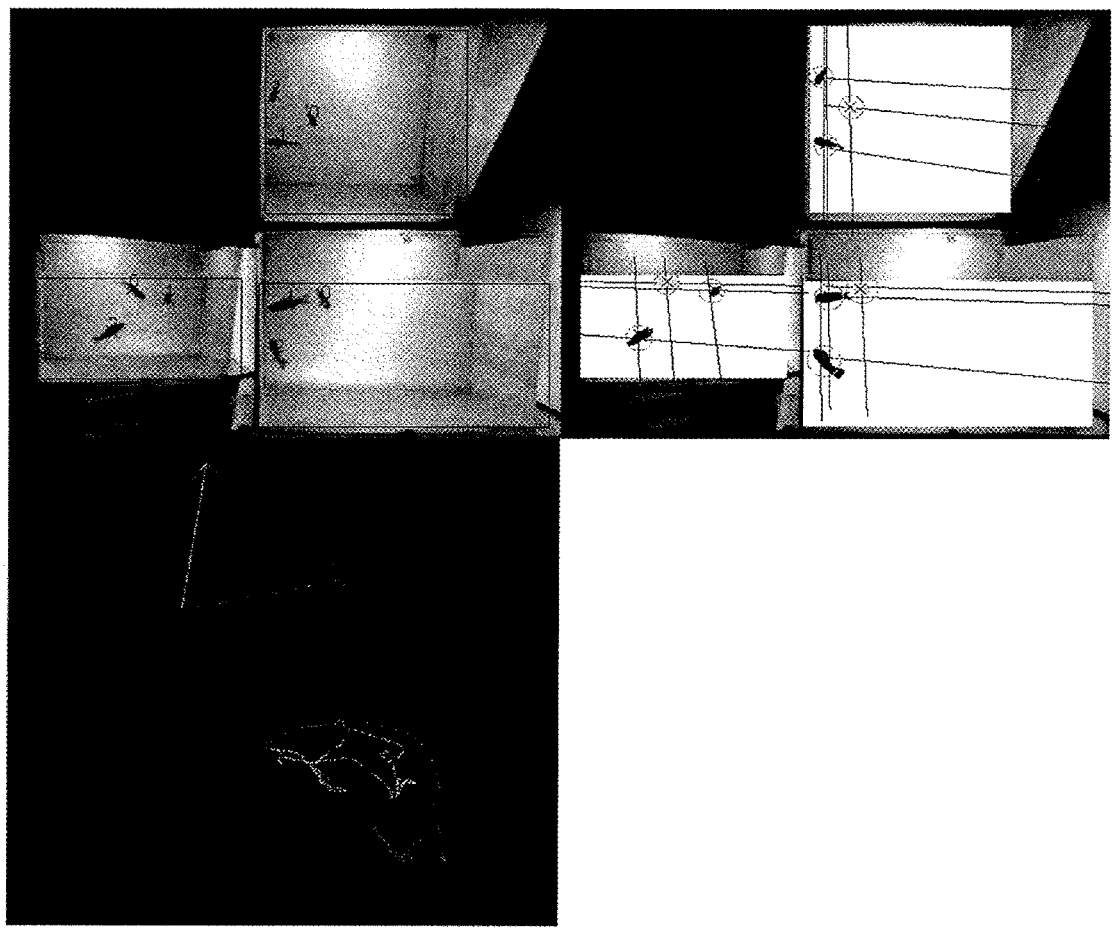
FIG. 10 shows an image frame where the test fish are identified, tagged and tracked by applying the corresponding software components of the invention. Top left: original frame; top right: processed frame with tags assigned to the test fish; Bottom: reconstructed 3-D motion trajectories of the test fish.
Figure 11:
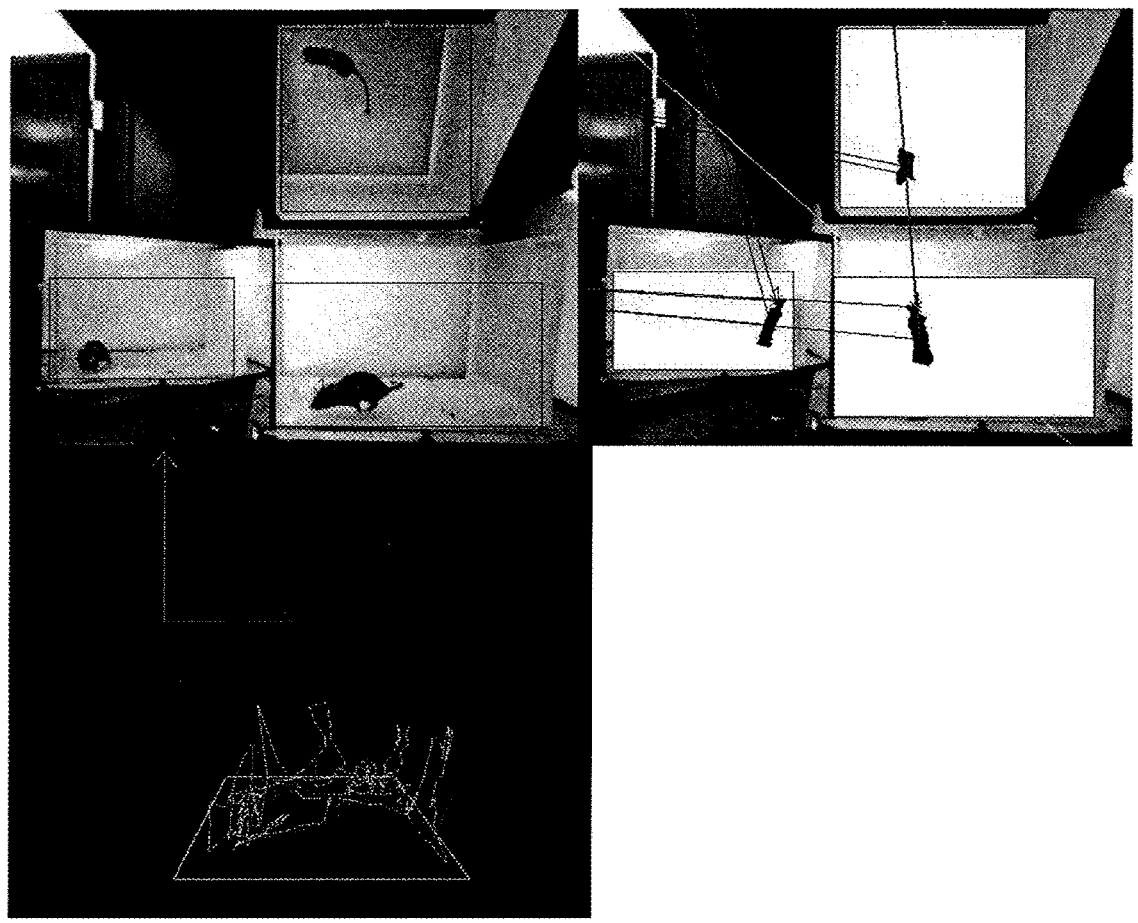
FIG. 11 shows a image frame where two feature points of a test mouse are identified, tagged and tracked by the corresponding software components of the invention. Top left: original frame; top right: processed frame with tags assigned to the feature points on the test mouse; Bottom: reconstructed 3-D motion trajectories of the feature points on the test mouse.

In the preferred embodiment, the re-tagging component comprises several methods to apply secondary constraints for temporal consistency. First, dynamic templates are generated and maintained along the frame sequence for all the targets being monitored. For any frame, such templates contain all the corresponding pixels of the tagged target markers on the image plane. These templates are also directed by 2D Kalman filters and are used to distinguish different targets whenever the images of the targets merge. Furthermore, the extended volumetric 3-D paths of the body contours of the targets are consistently checked along the temporal axis to make sure that they don't intersect with each other after merge-and-split. FIGS. 10 and 11 show an acquired image frame, the processed image, and the on-line reconstructed 3-D trajectories where the markers of goldfish and mice are identified and tagged after imposing both spatial and temporal constraints.

3-D Reconstruction through Triangulation

The system may also comprise a software-based 3-D reconstruction component to reconstruct the 3-D position of the target from its markers, i.e., to determine the actual 3-D position of the target from the images obtained from all the cameras. Triangulation method is employed in the 3-D reconstruction component. The triangulation process for obtaining the 3-D position of targets without light refraction is carried out as described below.

After correct correspondences are established among the marker images of a target, the triangulation component can calculate the 3-D positions with the following equations:

$$(P^C + P^M) \cdot u = 2d$$

$$(P^C - P^M) \times u = 0$$

Here $P^C$ and $P^M$ are the 3-D position of the target and the mirrored position of the same target (see FIG. 6), u is the normal of the mirror, and d is the distance from the COP of the actual camera to the mirror plane. Both $P^C$ and $P^M$ can be represented in parametric forms as described in basic calibration, with known correspondence of the markers in the regions of the actual camera and virtual camera (see FIG. 6). If there is no available marker of a target in the region of the actual camera, which is possibly caused by occlusion, the following equation can be used to eliminate $P^C$ for the solution of $P^M$s in two mirrors. It can also be used to recover the actual 3-D positions of the target when the mirrored positions are obtained.

$$P^C = P^M - 2(P^M \cdot u - d)u$$

In the case of monitoring the motion behavior of aquatic animals, the triangulation method is justified to accommodate the refraction of sighting rays, according to the calibrated locations and orientations of the media interfaces.

Figure 12:
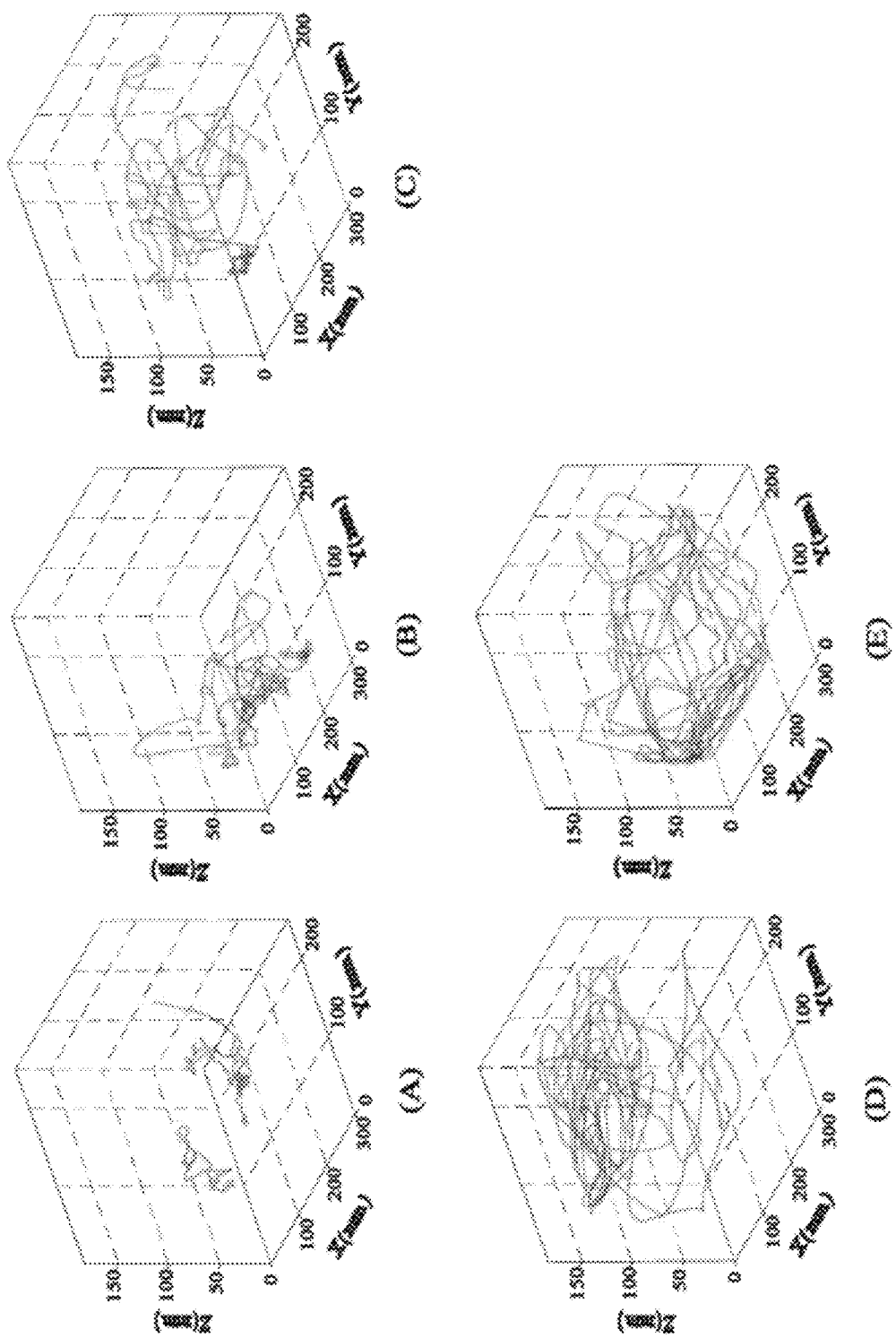
FIG. 12 shows examples of reconstructed 3-D swimming trajectories of three goldfish in an alcohol addiction test. The monitoring time is 5 minutes, where (A) a control group with no ethanol added; (B) a test group with ethanol/water volumetric concentration 0.25%; (C) a test group with ethanol/water volumetric concentration 0.5%; (D) a test group with ethanol/water volumetric concentration 1.0%; (E) a test group with ethanol/water volumetric concentration 1.5%.
Figure 13:
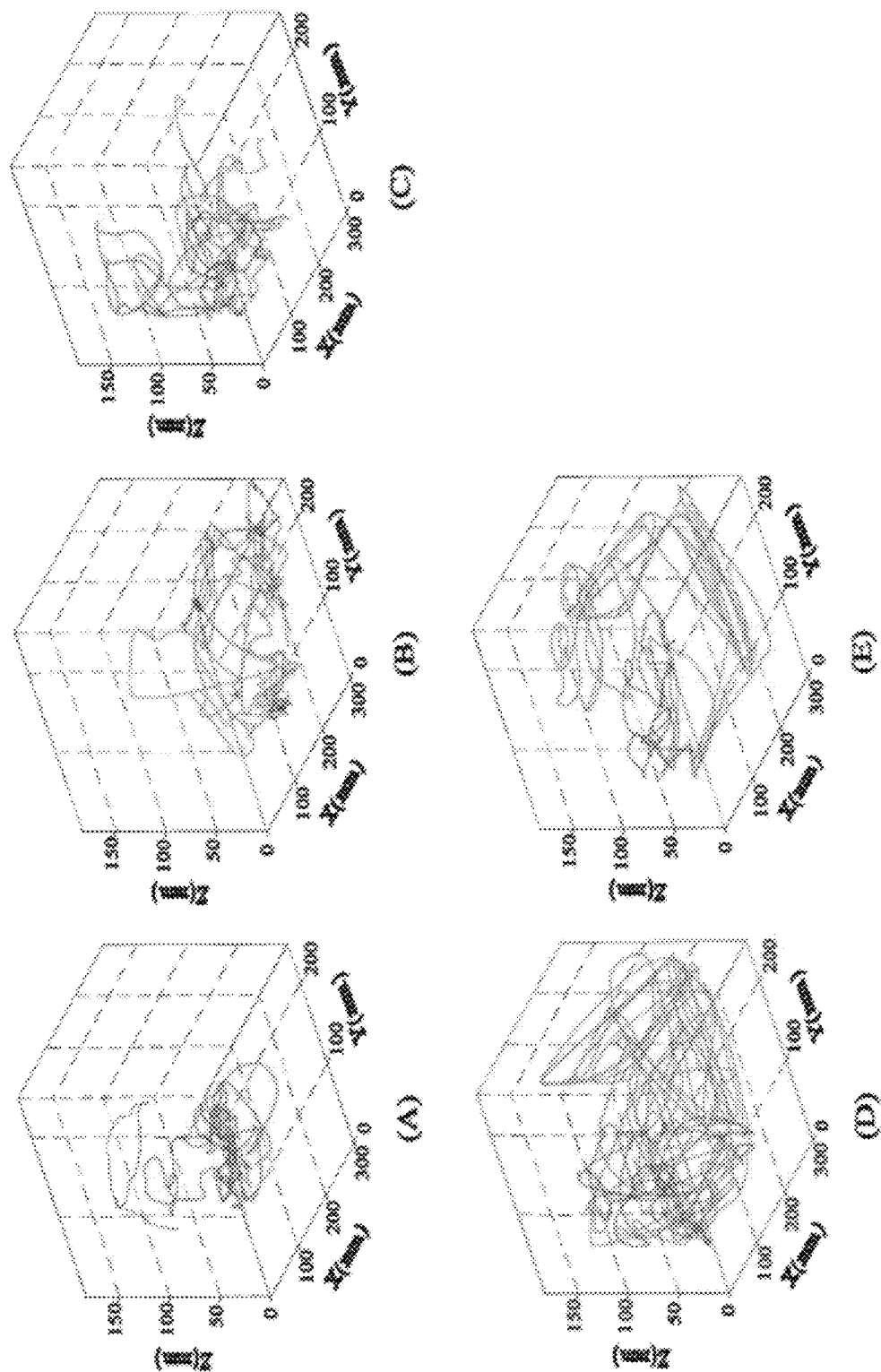
FIG. 13 shows another example of reconstructed 3-D swimming trajectories of three goldfish in an alcohol addiction test. The monitoring time is 5 minutes, where (A)'s a control group with no ethanol added; (B)'s a test group with ethanol/water volumetric concentration 0.25%; (C)'s a test group with ethanol/water volumetric concentration 0.5%; (D)'s a test group with ethanol/water volumetric concentration 1.0%; and (E)'s a test group with ethanol/water volumetric concentration 1.5%.
Figure 14:
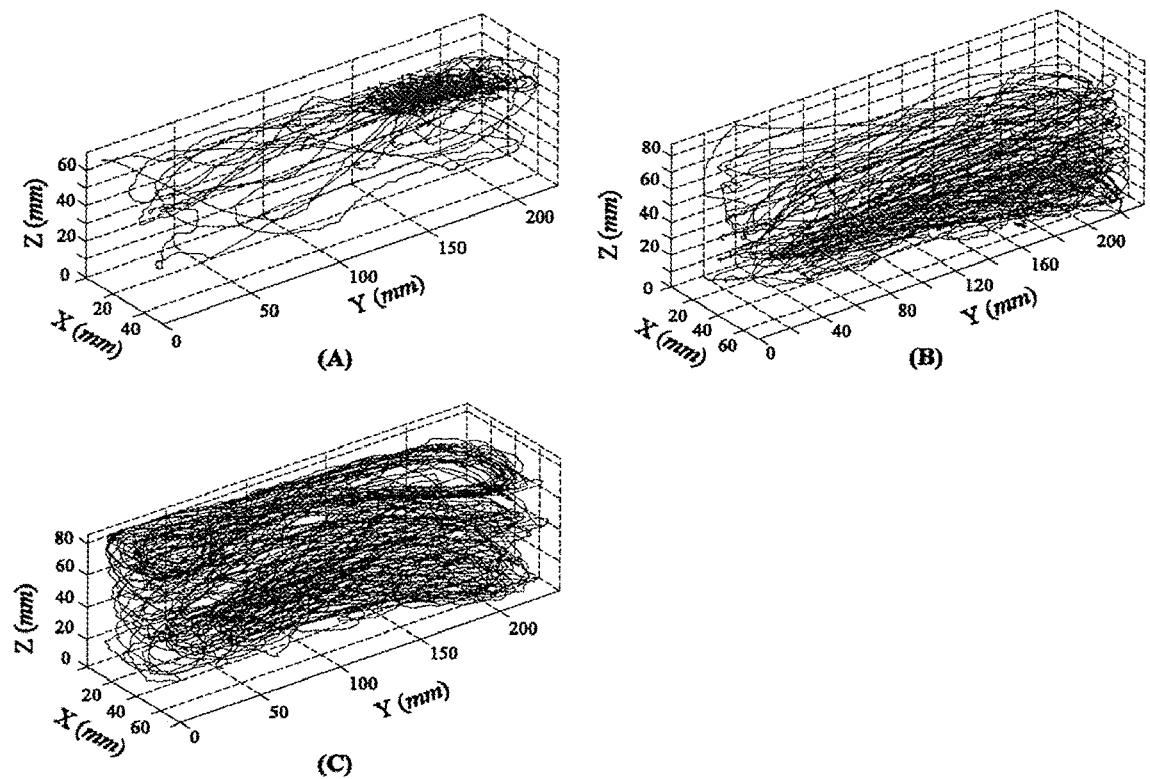
FIG. 14 shows examples of reconstructed 3-D swimming trajectories of one zebrafish in an alcohol addiction test. The monitoring time is 15 minutes, where (A)'s control with no ethanol added into the water; (B)'s a test zebrafish with ethanol/water volumetric concentration 0.25%; and (C)'s a test zebrafish with ethanol/water volumetric concentration 0.5%.
Figure 15:
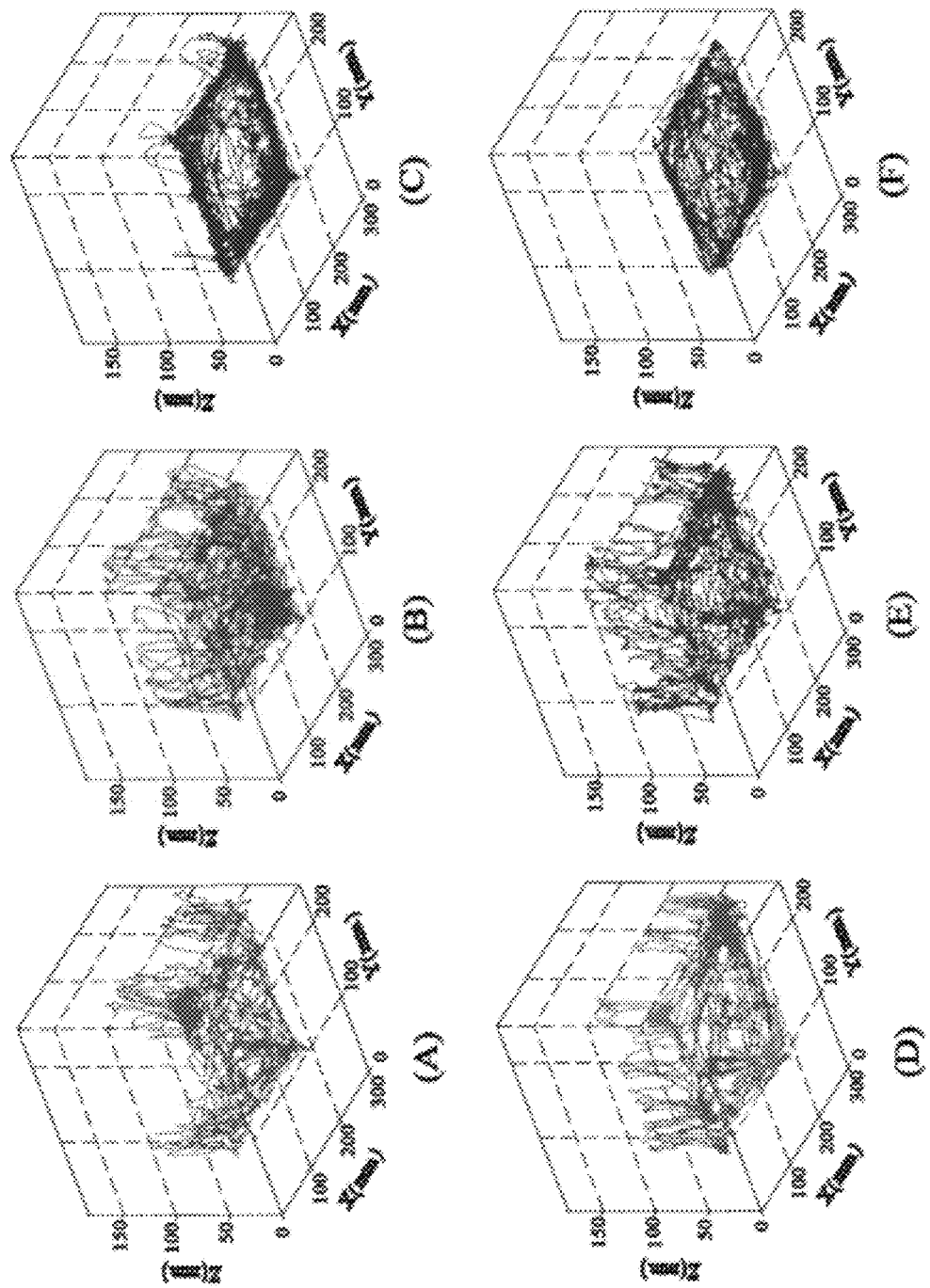
FIG. 15 shows examples of reconstructed 3-D motion trajectories of a mouse head after abdominal ethanol injection. The monitoring time is 10 minutes. (A) & (D) are control mice with no ethanol injection; (B) & (E) are test mice after ethanol injection with body weight-normalized ethanol concentration 0.2 g/kg; and (C) & (F) are test mice after ethanol injection with body weight-normalized ethanol concentration 2.0 g/kg.
Figure 16:
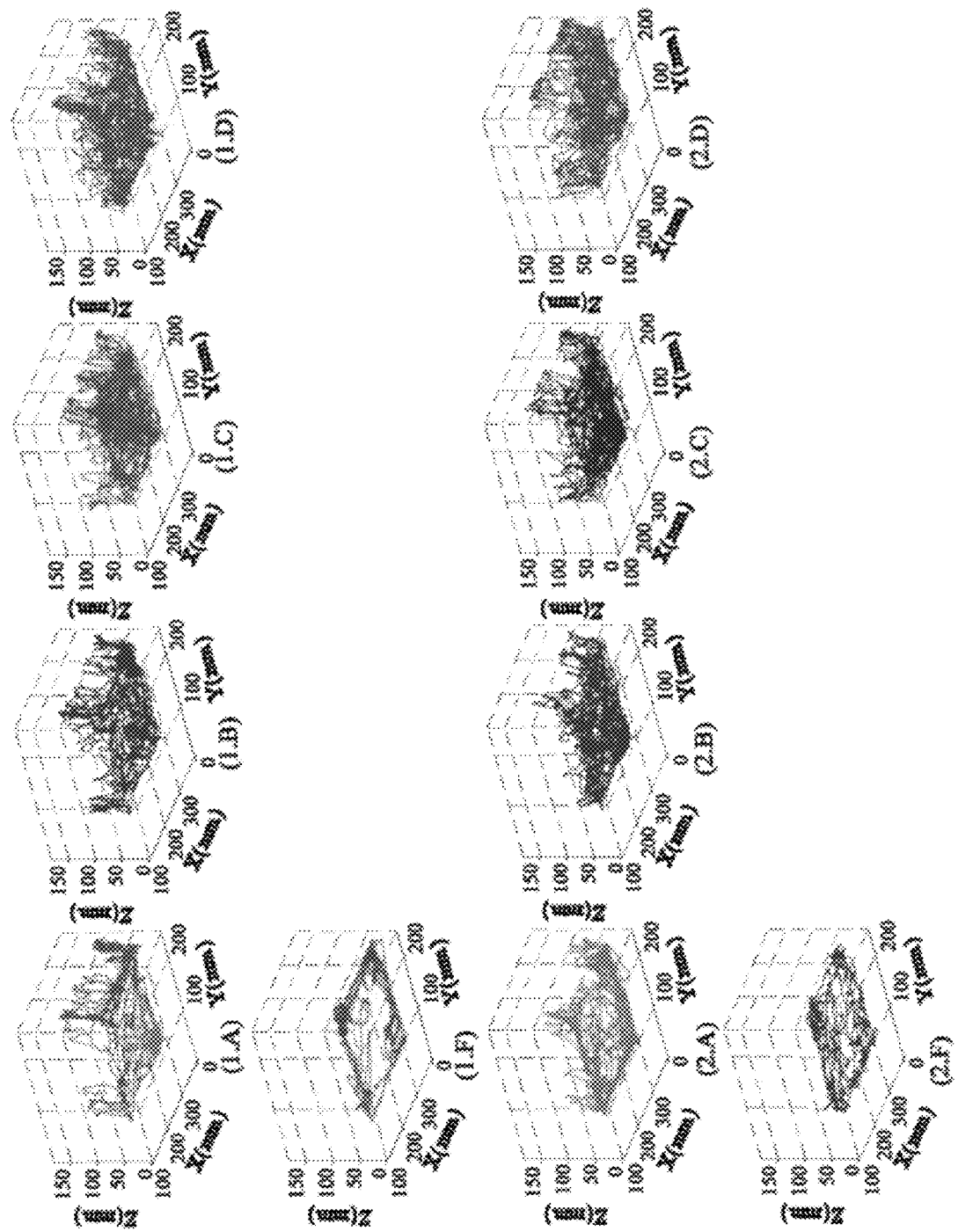
FIG. 16 illustrates examples of reconstructed 3-D trajectories of a mouse head after abdominal caffeine injection. The monitoring time is 10 minutes. (1.A) & (2.A) are control mice with no caffeine injection; (1.B) & (2.B) are test mice after caffeine injection with body weight-normalized caffeine concentration of 6.25 g/kg; (1.C) & (2.C) are test mice after caffeine injection with a body weight-normalized caffeine of concentration 12.5 g/kg; (1.D) & (2.D) are test mice after caffeine injection with a body weight-normalized caffeine concentration of 25 g/kg; (1.E) & (2.E) are test mice after caffeine of injection with a body weight-normalized concentration caffeine of 100 g/kg.

FIGS. 12 and 13 show the reconstructed 3-D locomotion trajectories of three goldfish in alcohol response tests. FIG. 14 shows the reconstructed 3-D locomotion trajectories of a single zebrafish in alcohol response tests. FIG. 15 shows the reconstructed 3-D motion trajectories of the head of mouse (feature point is set as the middle point of two ears) in alcohol addiction response tests. FIG. 16 shows the reconstructed 3-D motion trajectories of the head of mouse in caffeine addiction response tests.

Data Post-Processing

Figure 17:
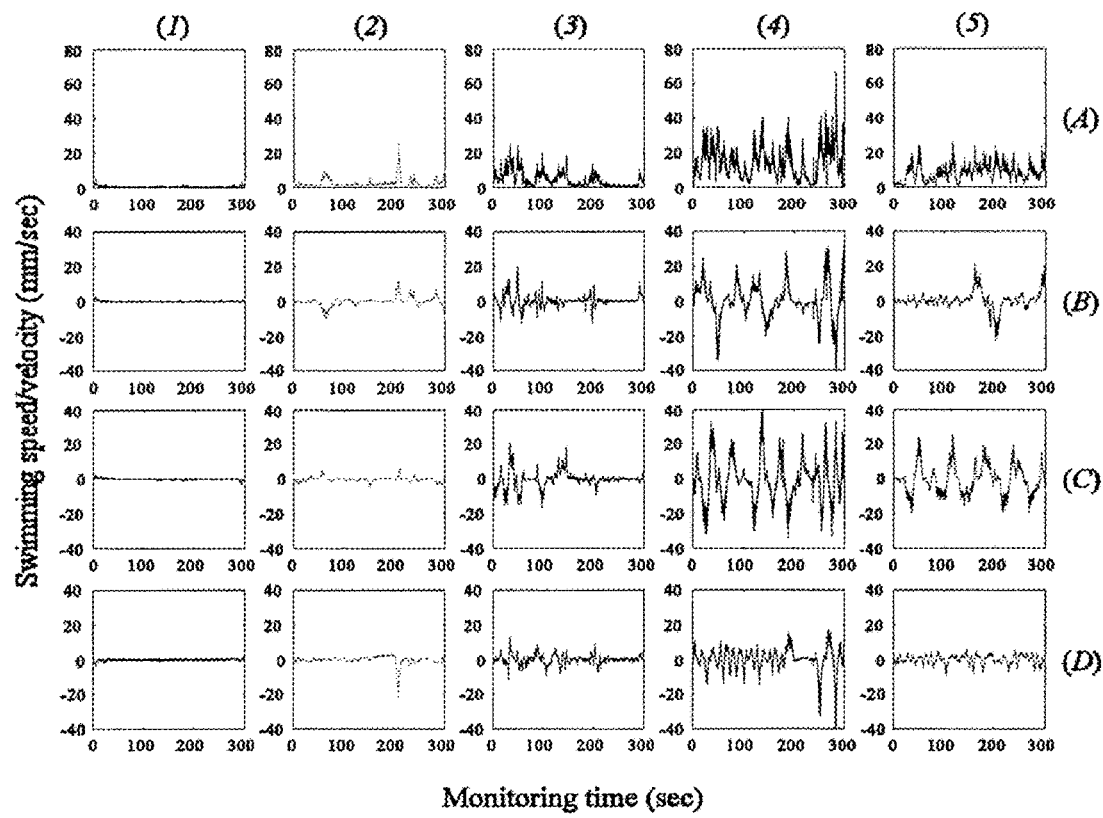
FIG. 17 illustrates sample time series of swimming speed and velocities of goldfish in an alcohol addiction test. (A) shows the swimming speed in 3-D space; (B) shows the swimming velocity in X direction (X direction is shown in FIG. 11); (C) shows the swimming velocity in Y direction (Y direction is shown in FIG. 11); (D) shows the swimming velocity in Z direction (Z direction is shown in FIG. 11); (1)'s a control fish; (2)'s a test fish with ethanol/water volumetric concentration 0.25%; (3)'s a test fish with ethanol/water volumetric concentration 0.5%; (4)'s a test fish with ethanol/water volumetric concentration 1.0%; and (5)'s a test fish with ethanol/water volumetric concentration 1.5%.
Figure 18:
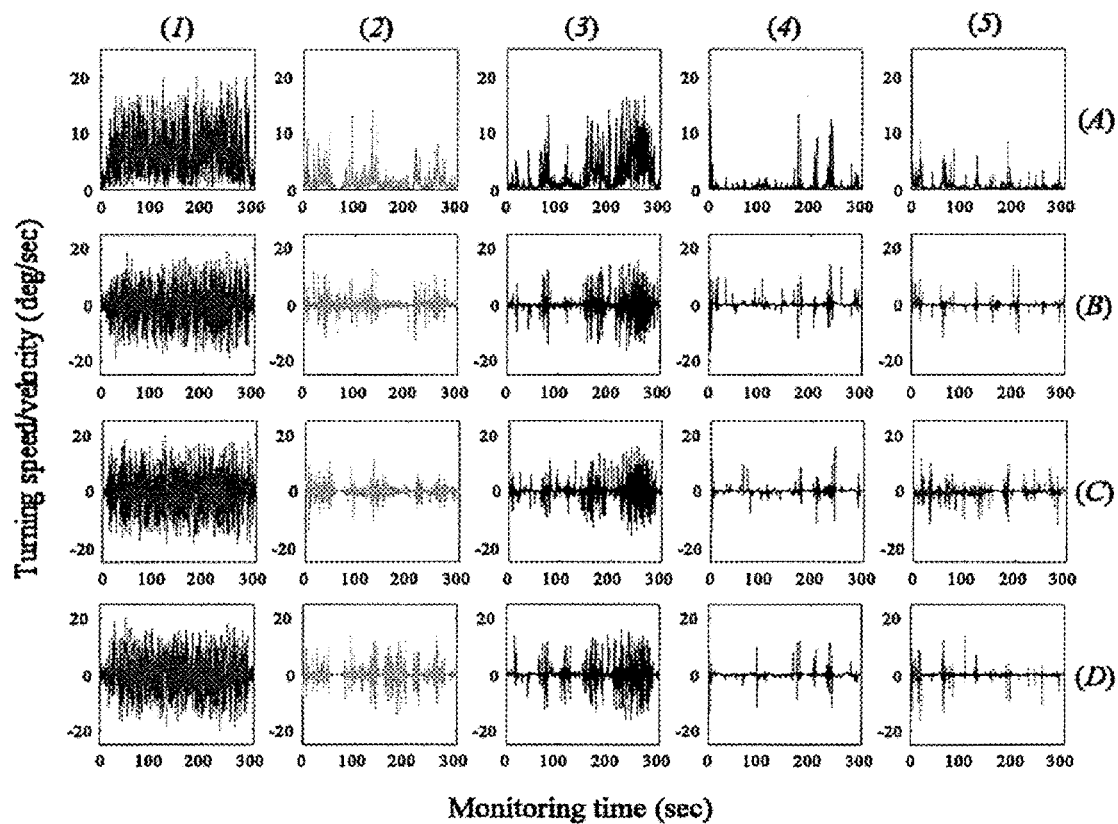
FIG. 18 illustrates sample time series of turning speed and velocities of goldfish in an alcohol addiction test. (A) shows the turning speed in 3-D space; (B) shows the turning velocity about X axis (X axis is shown in FIG. 11); (C) shows the turning velocity about Y axis (Y axis is shown in FIG. 11); (D) shows the turning velocity about Z axis (Z axis is shown in FIG. 11); (1)'s a control fish; (2)'s a test fish with ethanol/water volumetric concentration 0.25%; (3)'s a test fish with ethanol/water volumetric concentration 0.5%; (4)'s a test fish with ethanol/water volumetric concentration 1.0%; and (5)'s a test fish with ethanol/water volumetric concentration 1.5%.
Figure 19:
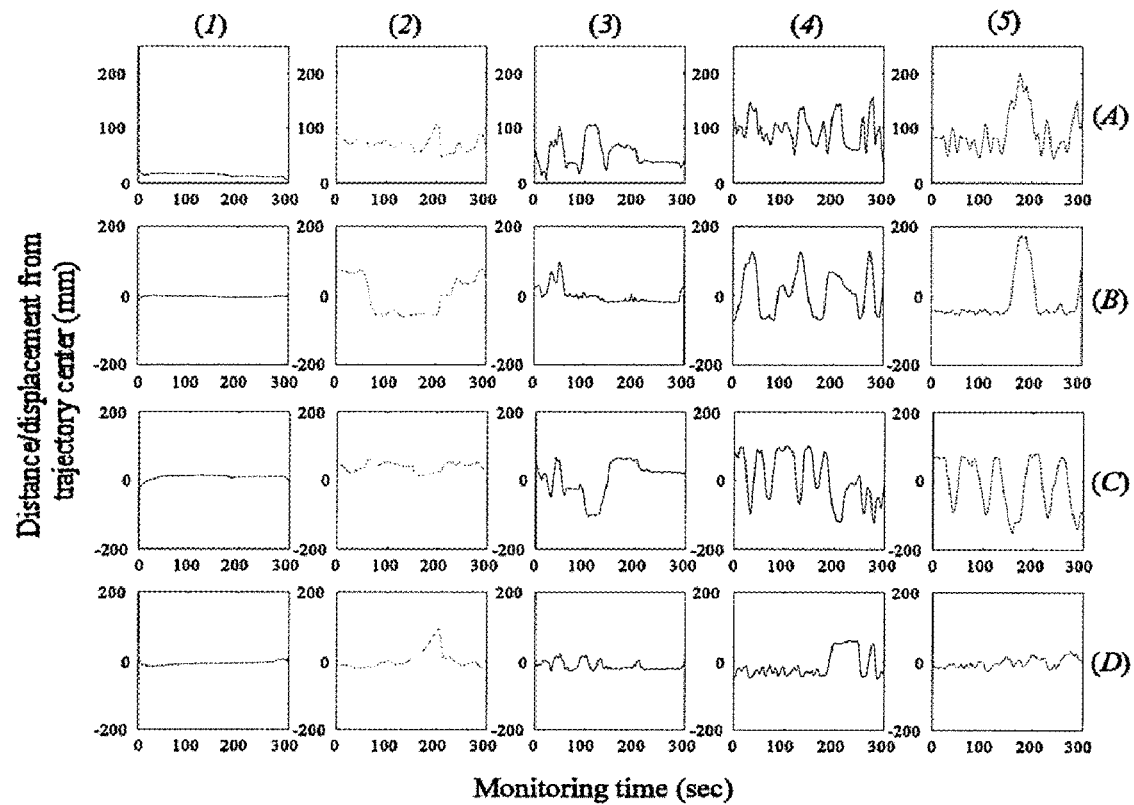
FIG. 19 illustrates sample time series of distance and displacements from trajectory center of goldfish in an alcohol addiction test. (A) shows the distance from trajectory center in 3-D space; (B) displacement from trajectory center in X direction (X direction is shown in FIG. 11); (C) displacement from trajectory center in Y direction (Y direction is shown in FIG. 11); (D) displacement from trajectory center in Z direction (Z direction is shown in FIG. 11); (1) a control fish; (2) a test fish with ethanol/water volumetric concentration 0.25%; (3) a test fish with ethanol/water volumetric concentration 0.5%; (4) a test fish with ethanol/water volumetric concentration 1.0%; (5) a test fish with ethanol/water volumetric concentration 1.5%.
Figure 20:
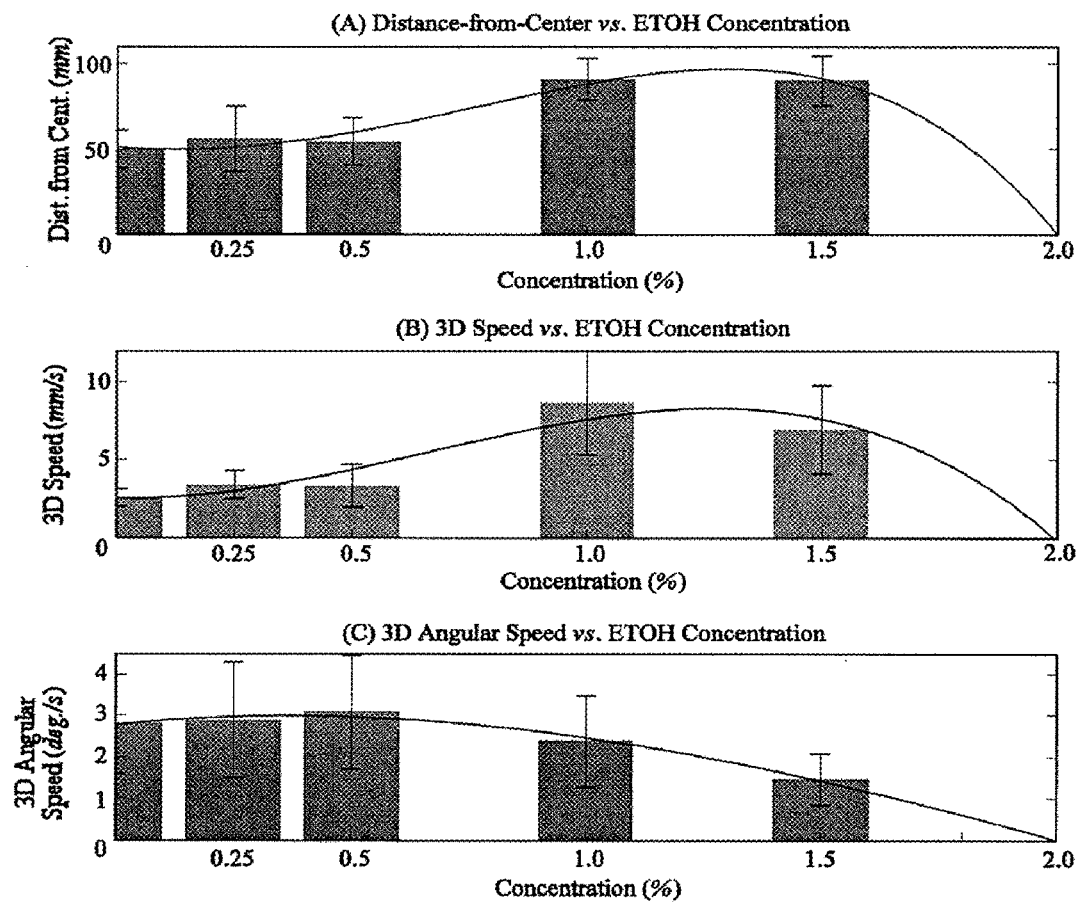
FIG. 20 illustrates a sample of behavioral response curves of goldfish in alcohol an addiction test. (A) shows point estimates, confidence intervals and response curve of the average distance from trajectory center versus ethanol concentration; (B) shows point estimates, confidence intervals and response curve of average 3-D linear speed versus ethanol concentration; (C) shows point estimates, confidence intervals and response curve of average 3-D angular speed versus ethanol concentration.

The system of the present invention further comprises a data post-processing component. The data post-processing component is capable of smoothing and de-noising the 3-D trajectories of the targets, as well as extracting the motion variables of interest automatically from the reconstructed 3-D trajectories of targets. The data post-processing component is further capable of performing descriptive and inferential statistical analysis on the extracted motion variables. FIGS. 17 to 19 show the extracted swimming speed and velocities, turning speed and turning velocities, and distance and displacements from their trajectory center from sample 3-D locomotion trajectories of targets in alcohol addiction tests on goldfish. FIG. 20 shows the results of statistical analysis of sample motion variables in goldfish alcohol addiction tests.

Figure 9:
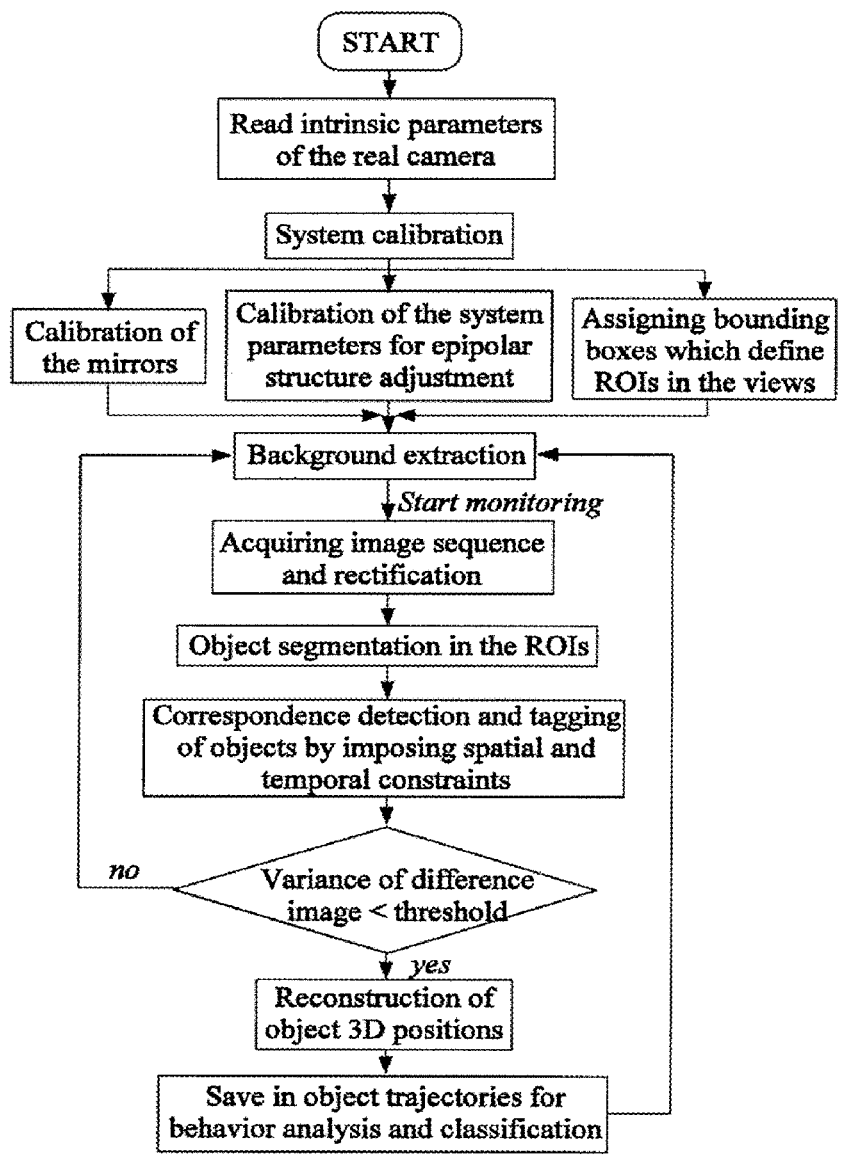
FIG. 9 shows a flowchart of a real-time and on-line process for monitoring the 3-D swimming trajectories of aquatic animals.

FIG. 9 illustrates a particularly preferred system and method for tracking the 3-D motion of laboratory animals.

On-Line and Off-Line Monitoring Process

In a preferred embodiment, the system can work in three modes: the off-line calibration mode, on-line or off-line monitoring mode, and on-line/off-line post-processing mode.

In the preferred embodiment, the monitoring process is carried out in an on-line mode. In the online mode, a image frame is acquired at a certain time instant, and then be processed for the current 3-D positions of the targets. These 3-D positions are added to the current trajectories, which are smoothed, de-noised, and processed for the motion variables of interest dynamically. In the off-line monitoring mode, the monitoring software may be decoupled into several modules, including the video capturing module, the video processing module, and the data analysis module. In the video capturing module, the video sequence of monitoring process is acquired and stored in certain media, such as internal or external hard disk and video tapes, in a compressed image format or raw image format. A time stamp sequence is also stored, which contains the temporal information associated with the video sequence. The video sequence can be retrieved at any later time for observations or image processing. The video-processing module takes the recorded video sequence as input, and performs all the image processing tasks for the raw re-constructed 3-D trajectories. The data analysis module takes the re-constructed 3-D trajectories and the recorded time stamp sequence as inputs, and performs the data processing tasks such as trajectory smoothing, trajectory de-noising, kinematics analysis, and statistical analysis.

Graphical User Interface

Figure 21:
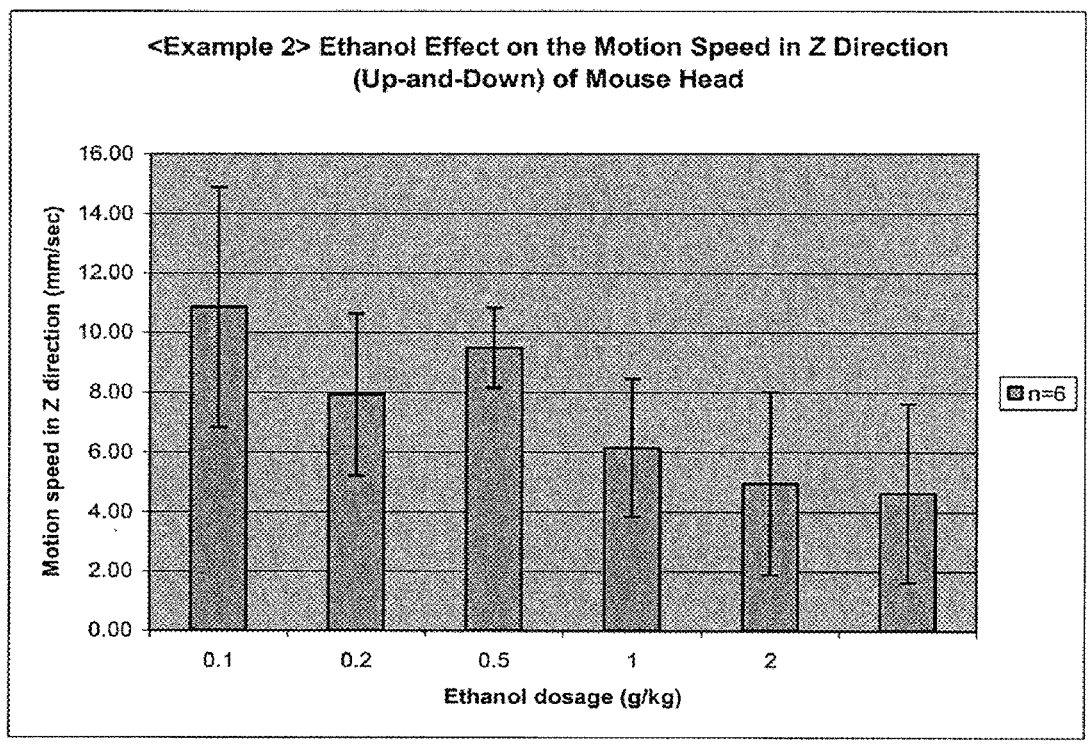
FIG. 21 shows the group means and standard deviations of the up-and-down motion speed of a mouse head, which is obtained from the experiments in example 2 (ethanol-induced behavior change of mice).

In this embodiment, the graphical user interface (GUI) for real-time behavior monitoring is composed of three windows: the real-time video captured by the actual camera, the foreground markers with tagging indices obtained by the software segmentation and identification components; and the recovered 3-D swim trajectories of targets, as shown in FIGS. 10 and 11. Interactive explorations can be performed on this window using the 3-D motion reconstruction component of the invention. In a preferred embodiment, the 3-D motion reconstruction component performs translation, rotation, and scaling according to the camera coordinates. FIG. 21 shows an example of GUI for on-line monitoring process for rodent nocturnal behavior, in which blacklights are used as ambient illumination source while the feature points on the rodent body are marked with fluorescent dyes.

In a particularly preferred embodiment, the software components of the invention are Visual C#.NET or Visual C++ programmed within a windows XP platform with OpenGL graphical support. Examples of other platforms include, but are not limited to, MAC, UNIX, LINUX, etc.

EXAMPLES

The following examples set forth exemplary embodiments of the 3-D behavior monitoring system of the invention for monitoring and analyzing the locomotion and motion-related behavior of experimental laboratory animals. The examples are provided for illustration only, and nothing therein should be taken as any limitation upon the overall scope of the invention.

Example 1

Monitoring the Change in 3-D Swimming Locomotion of Goldfish (*Carassius auratus*) Induced by Adding Ethanol in Water Change in fish locomotion responses to various chemical compounds are monitored, quantified and analyzed by the system and methods of the invention. For instance, one of such experiments is the alcohol addiction response of goldfish. In this exemplary behavior monitoring experiment, goldfish (*Carassius Auratus*) of average body length 35~40 mm with identical biological conditions were screened and raised for alcohol response. The goldfish were then divided into 5 groups, as shown in Table 3. The fish to be tested were kept in identical and natural environment for several days. Before the monitoring process, they were taken out and habituated for one hour in the tanks with the specified alcohol concentration values. Each monitoring process lasted for 15 minutes. To exclude any transient response induced by a novel environment, the fish trajectories in the last 5 minutes were analyzed for behavior end points. To demonstrate the capability of the monitoring system of the invention to simultaneously track multiple fish, up to three fish with same treatments were transferred into the test tank for a monitoring run. Other parameters (e.g., time, temperature, etc.) were carefully controlled for any variance through the overall experiment process. FIGS. 12 and 13 illustrate some examples of the reconstructed 3-D trajectories from the experiments conducted, with one randomly selected monitoring run for each group.

Kinematic analysis was carried out automatically by the system once the experiments were completed. Based on the monitored 3-D locomotion trajectories of fish, such analysis was carried out for a variety of multivariate time series (MTS) for further feature extraction in both time and frequency domains. FIG. 17 to FIG. 19 show examples of these derived time-series (swimming speed/velocity, turning speed/velocity, and distance/displacement from trajectory center, with the trajectory center $C_T$ of a fish computed as $$C_T = \frac{1}{T}\int_0^T M(t)\,dt,$$

where M(t) is the 3-D location of the fish as a function of time, and T is the time span of the monitoring process) for some cases selected randomly from the experiment. FIG. 20 shows the point estimates and the 95% confidence intervals of the mean values of the 3-D distance from trajectory center (DFC), 3-D linear speed, and 3D angular speed, respectively, against ethanol/water concentration. The least square-fitted response curves are also shown in FIG. 20, indicating the relation between the behavior end points and the ethanol concentration values. Table 4 shows the computed P values from one-way ANOVA analysis regarding the end points of the 5 groups in Table 3. Furthermore, FIGS. 34 and 35 show the computed P values from the group-wised post-hoc mean comparison on the average DFC and 3D linear speed, respectively.

As shown in FIG. 19(A) and FIG. 19(B), the goldfish tended to swim faster along more spread-out paths when the alcohol concentration was elevated from zero. These trends became more pounced when the concentration was increased until a certain value (approximately 1.3% in this case). When the concentration was increased passed this point, the locomotion of the goldfish again became slower as the swimming paths are restrained to smaller areas until they eventually stopped moving (all the fish deceased under 2% alcohol concentration) when the alcohol concentration becomes too high for them to survive. On the other hand, FIG. 20(C) shows that the turning rate of the goldfish became consistently lower when the alcohol concentration was increased from zero.

These observed phenomena coincide with the common knowledge regarding the alcohol responses of animals. As illustrated in FIG. 33, significant difference of average DFC and 3D linear speed was found among goldfish groups, while no significant difference for average 3-D turning rate was found. The results from post-hoc tests of means, as shown in FIGS. 34 and 35 indicate that for both average DFC and 3-D swimming speed: (i) there was no significant difference among the control group, the test group 1 (ethanol/water concentration 0.25%) and test group 2 (ethanol/water concentration 0.5%); (ii) there is no significant difference between test groups 3 (ethanol/water concentration 1.0%) and 4 (ethanol/water concentration 1.5%); and (iii) the difference between the control group, test groups 1 and 2 and test groups 3 and 4 was significant. These results show similar trends that have been seen in published results regarding the alcohol responses of experimental lab fish.

Example 2

Rating Ethanol-Induced Intoxication by Monitoring the Change in 3-d Motion of Mouse Head In this example, the invented 3-D behavior monitoring system is applied to quantitatively identify detailed differences in mouse locomotion caused by ethanol injection-induced intoxication. The focus of the associated experiments was to discover the details in behavior change that are totally objective yet hard to detect by human observations or 2-D monitoring systems.

Female ICR mice 21-25 grams were obtained from Charles River Laboratory. These mice were housed in lab animal facility for at least one week before the behavioral experiments. All mice were housed in standard mouse cages with food and water provided ad libitum. They were maintained with a 12:12-h-light-dark cycle with lights on at 9:00AM daily.

With pilot studies with genetically homogeneous mice and arithmetic rating scales, alcohol dosage were determined to be 0, 0.1, 0.2, 0.5, 1.0 and 2.0 g/kg for the behavioral experiments. Accordingly, test mice were divided into 6 groups with 6 mice in each group. In the morning of the experiments, yellow and blue fluorescence dyes were painted on the left and right ears of every mouse respectively. These fluorescence dyes serve as feature points or targets to be monitored. Ethanol solutions with concentration 0.2 to 2 g/10 ml in saline (0.9% NaCl) were prepared fresh daily. Every mouse was weighed and then injected with ethanol solution according to the selected dosage. The mouse was then put in the animal container in the monitoring system for 10 minutes before behavior monitoring. The inside of the monitoring chamber was illuminated by black lights to stimulate the fluorescence dyes. For each monitoring, the video image sequence were recorded for 10 minutes and then stored on computer hard disk. The recorded video sequences were retrieved later for the 3-D reconstruction of the motion trajectories of the feature points and data post-processing. The animal container was cleaned after each monitoring process was completed.

Figure 23:
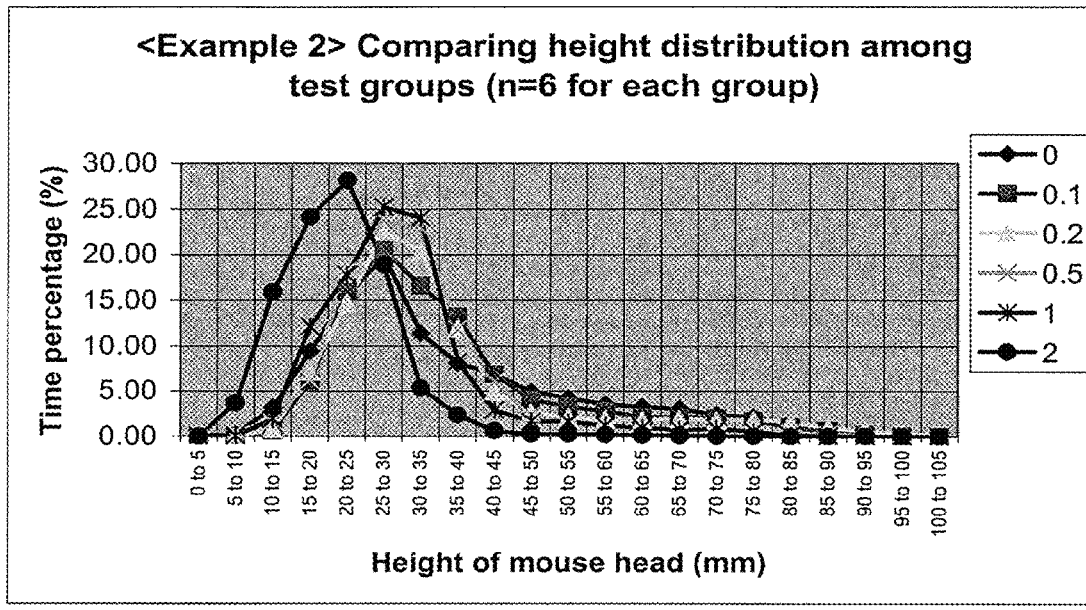
FIG. 23 shows the group-wised distribution of the height of mouse heads when mice are injected with ethanol solutions with different dosages, which is obtained from the experiments in example 2 (ethanol-induced behavior change of mice).
Figure 24:
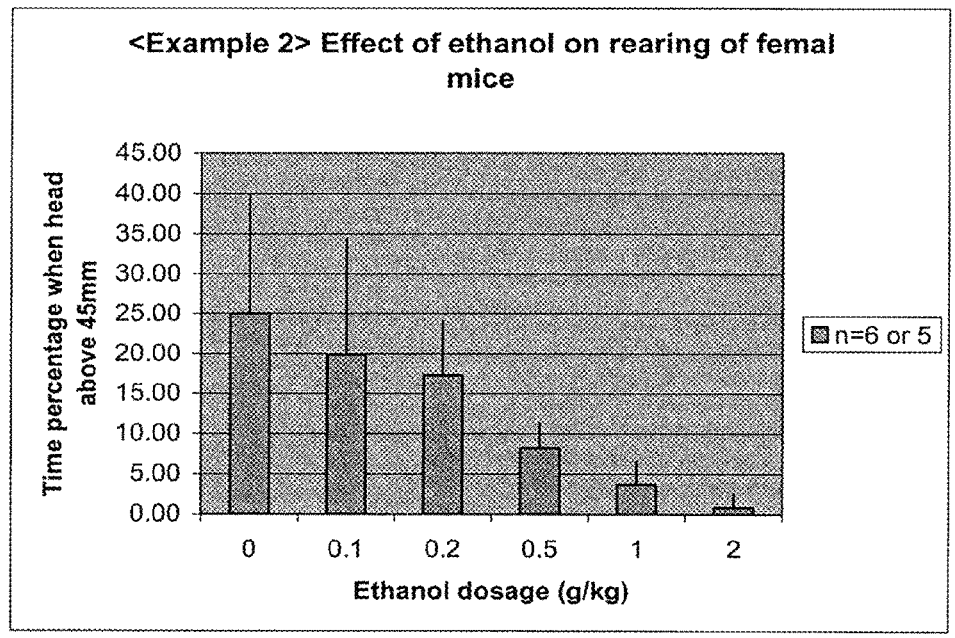
FIG. 24 shows the effect of ethanol injection on the rearing behavior of mice, which is obtained from the experiments in example 2 (ethanol-induced behavior change of mice).
Figure 25:
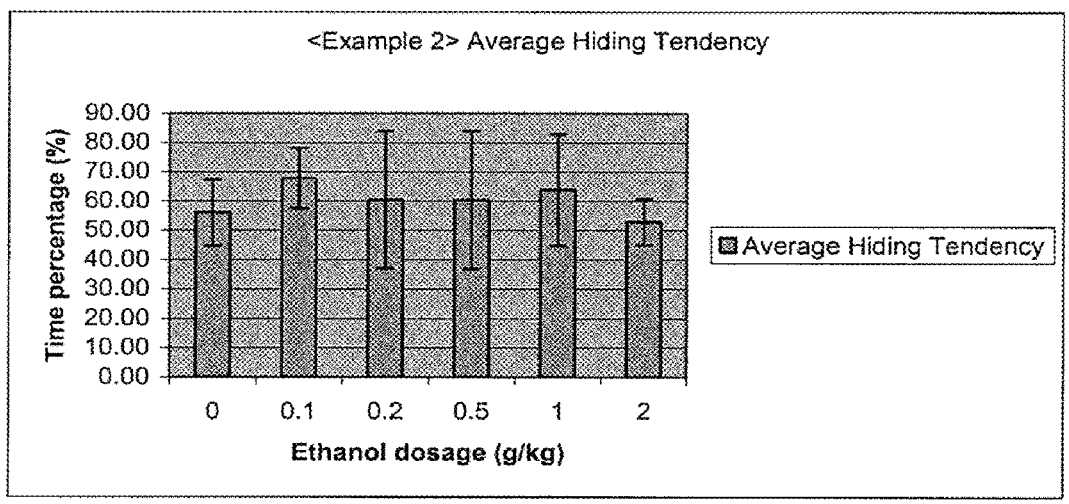
FIG. 25 shows the group means and standard deviations of time percentage, in which mice stay at the rear-half of an animal container. This is obtained from the experiments in example 2 (ethanol-induced behavior change of mice).
Figure 26:
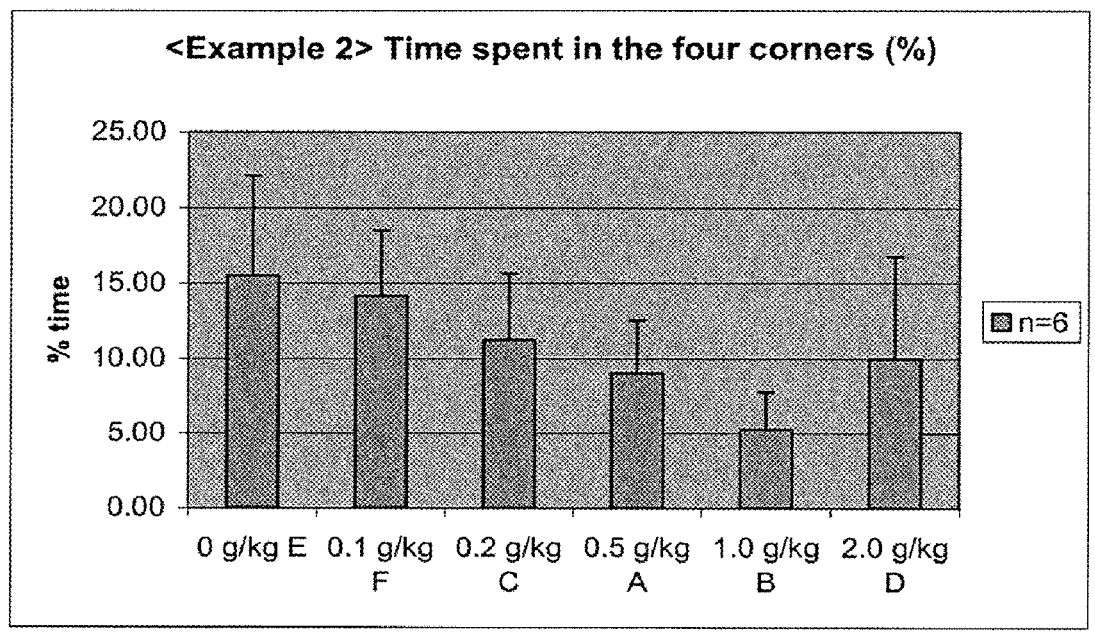
FIG. 26 shows the group means and standard deviations of the time percentage when mice stay at the corners of the animal container. This is obtained from the experiments in example 2 (ethanol-induced behavior change of mice).
Figure 27:
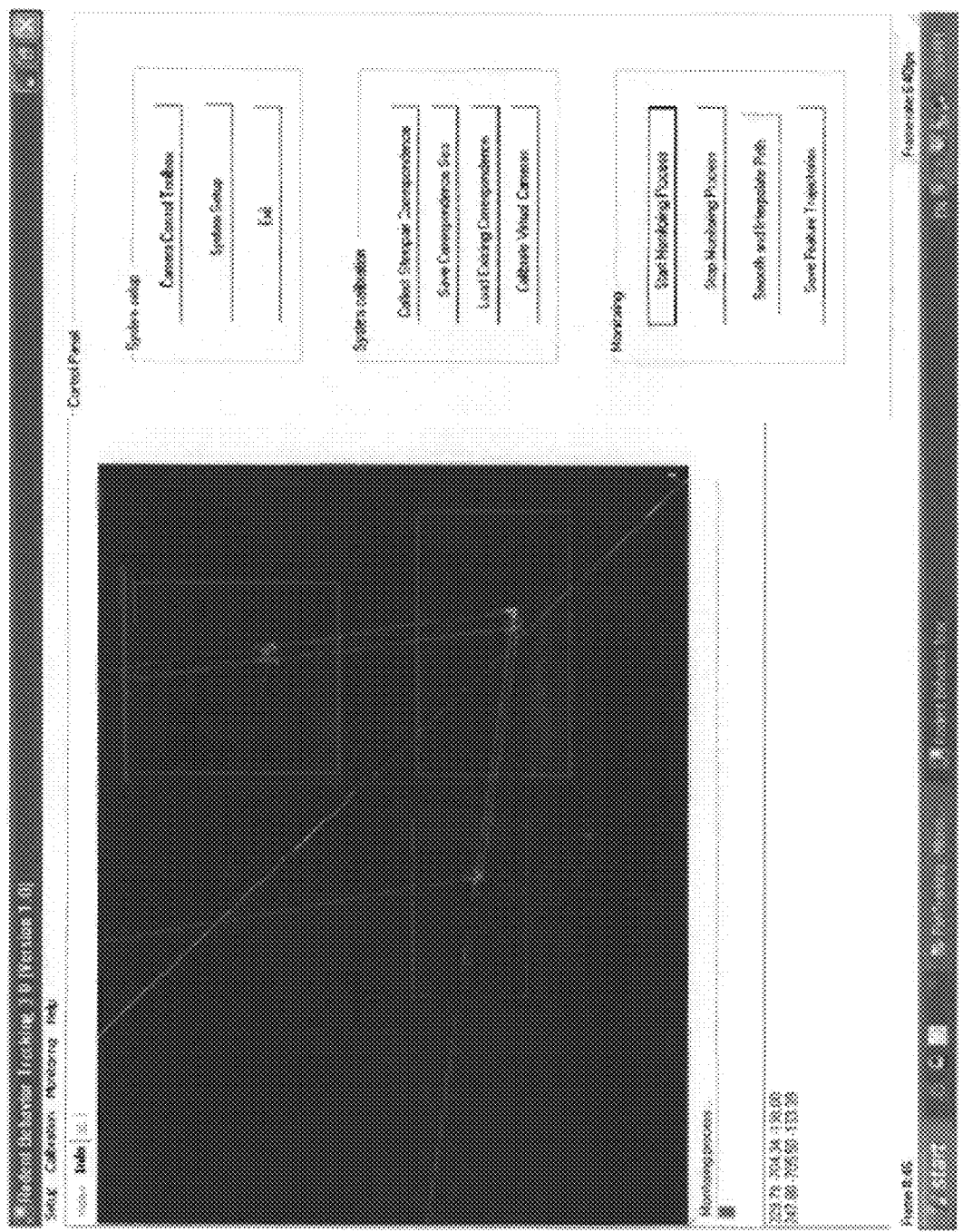
FIG. 27 is an exemplary graphical user interface (GUI) of the invention for the on-line and real-time monitoring process for rodent nocturnal behavior. Blacklights are used as an ambient illumination source while the feature points on the rodent ears are painted with fluorescent dyes.
Figure 28:
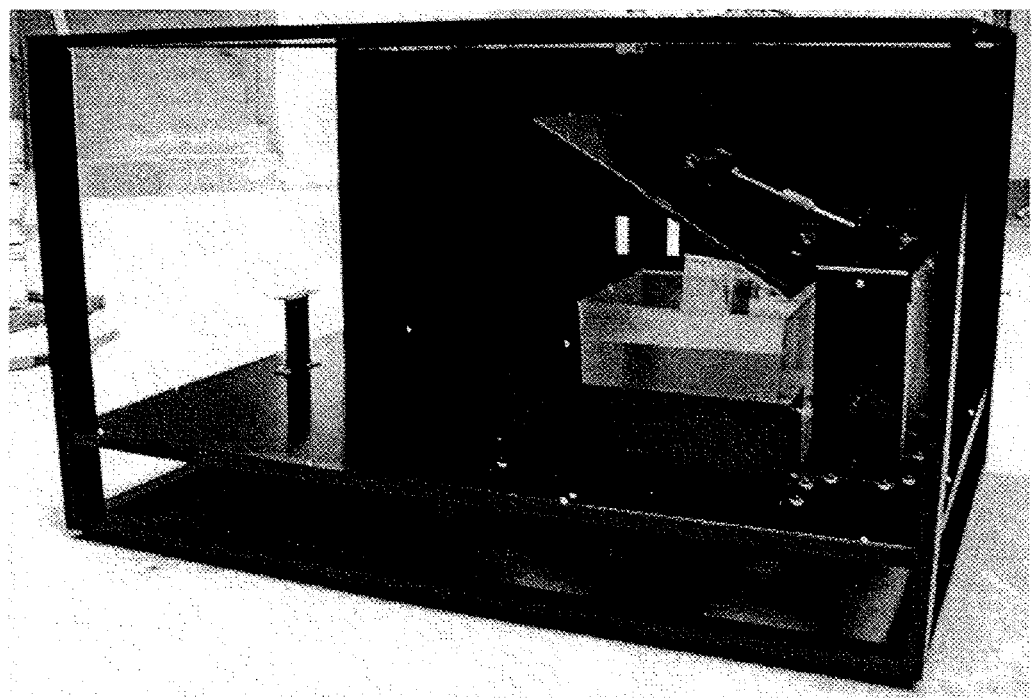
FIG. 28 is an exemplary hardware assembly of the 3-D behavior monitoring system of the invention, in which the outer covers are taken off from the frames in order to show the arrangement of internal hardware parts.

Motion parameters are computed from the reconstructed 3-D trajectories of the mouse heads. The position of mouse heads was taken as the middle point of the two ears of mouse. The parameters that are statistically analyzed included the motion speed, angular speed, acceleration and distance from the trajectory center (DFC). FIG. 21 shows the group means and standard deviations of the up-and-down motion speed of mouse head. FIG. 22 shows the group means and standard deviations of the 3-D distance from trajectory center (DFC) of mouse heads. To analyze the rearing behavior of the test mice, average durations of time span when mouse heads are at different heights were computed on a group-wised basis. The following four sections in height were designated: below 17 mm, 17 mm to 25 mm, 25 mm to 45 mm, and above 45 mm, with the last section corresponding to the rearing motion of mice. Duration in each height section is compared between each dosage group. FIG. 23 shows the distribution of the height of mouse heads in each group. FIG. 24 shows the effect of different ethanol dosage on the rearing behavior of mice. The time spent in the rear half of the animal container (hiding tendency) is also calculated and compared among groups. In addition, time spent at the four corners of the animal container is calculated and compared as the indication of exploration tendency. FIG. 25 shows the group means and standard deviations of time percentage, in which mice stay at the rear-half of the animal container. FIG. 26 shows the group means and standard deviations of the time percentage when mice stay at the corners of the animal container.

Subject's t tests are used for the group-wised comparison of these behavior end-points. Table 7 shows the results of group-wised mean comparison regarding the up-and-down speed of mouse head, with a "*" denotes a significant difference between the two groups being compared. Table 8 shows the results of group-wise mean comparison regarding the 3-D distance from trajectory center of mouse head. Table 9 shows the results of group-wise mean comparison regarding the time percentage of rearing during monitoring process.

FIG. 15 shows examples of reconstructed 3-D motion trajectories of mouse heads, in which (A) & (D) are the control mice with no ethanol injection; (B) & (E) are the test mice after ethanol injection with body weight-normalized ethanol concentration 0.2 g/kg; (C) & (F) are the test mice after ethanol injection with body weight-normalized ethanol concentration 2.0 g/kg.

From the statistical analysis on the motion parameters of mouse heads, eight basic motion parameters (3-D speed, 3-D angular speed, 3-D acceleration, DFC, the projection of 3-D speed on XY plane, the projection of 3-D angular speed on XY plane, the speed along Z-axis, the angular speed along z-axis) all yielded significant differences ($P<0.05$ or $P<0.001$) when compared to the control group (saline only) and sometimes the experimental groups (for example, see Tables 7 and 8).

Height distribution in four height sections showed significant difference especially for the 2.0 g/kg group (see Table 9).

Time spent in the rear half of the holding box did not show any difference (see FIG. 25).

Time spent at the four corners was significantly different among several of the groups (see FIG. 26).

The 3-D behavior monitoring system proved to be an efficient tool to distinguish minor changes in motion-related behavior subject to ethanol-induced toxicity. These differences could not be detected by eye yet they were dose-dependent and reproducible. In the present study, only 6 test animals are included in a test group and statistical significance has been detected in many paired comparisons already. By employing the same process with more test animals in each group we could test all types of mice with their responses to any chemical, with accurate results.

What is claimed is:

1. A three-dimensional monitoring system comprising at least two cameras, and a computer linked to at least one camera, wherein the system comprises an extended calibration component and monitors at least one subject, and wherein at least one camera is an actual camera.

2. The system according to claim 1, further comprising at least one virtual camera.

3. The system according to claim 2, wherein the virtual camera is obtained by reflecting the actual camera into a reflective surface.

4. The system according to claim 2, further comprising more than one virtual camera.

5. The system according to claim 2, wherein the virtual camera is selected from the group consisting of a reflective surface and a camera which is synchronized with the actual camera.

6. The system according to claim 2 or 3, wherein the actual camera captures the images of the targets and the mirrored images of the targets in the reflective surface.

7. The system according to claim 1 or 2, further comprising more than one actual camera.

8. The system according to claim 1 or 2, wherein the actual camera is capable of acquiring images on a frame-by-frame basis.

9. The system according to claim 1, wherein the actual camera is selected from the group consisting of a digital video camera and an analog video camera with a frame grabber.

10. A three-dimensional monitoring system comprising at least two cameras, and a computer linked to at least one camera, wherein the system comprises an extended calibration component and monitors at least one subject, and wherein the system is a catadioptric stereo system.

11. A three-dimensional monitoring system comprising at least two cameras, and a computer linked to at least one camera, wherein the system comprises an extended calibration component and monitors at least one subject, and wherein the camera forms more than one linearly independent view.

12. A three-dimensional monitoring system comprising at least two cameras, and a computer linked to at least one camera, an outer box confining the camera and an animal container within an enclosed space, wherein the system comprises an extended calibration component and monitors at least one subject.

13. A three-dimensional monitoring system comprising at least two cameras, and a computer linked to at least one camera, a visible indicator device selected from the group consisting of a light emitting diode (LED) or a colored end, wherein the system comprises an extended calibration component and monitors at least one subject.

14. The system according to claim 13, wherein the visible indicator device further comprises an electronic panel and programmable computer ports to automatically turn on and off the visible indicators.

15. A three-dimensional monitoring system comprising at least two cameras, and a computer linked to at least one camera, an animal container, wherein the system comprises an extended calibration component and monitors at least one subject.

16. The system according to claim 15, wherein the cameras include at least one actual camera and at least one virtual camera and wherein the animal container has at least two perpendicular faces which define a first and a second monitoring window.

17. The system according to claim 16, further comprising opaque faces to prevent the formation of reflective images thereon.

18. The system according to claim 16, wherein the axis of the actual camera is on a plane of the first monitoring window and the axis of the virtual camera is on a plane of the second monitoring window.

19. A three-dimensional monitoring system comprising at least two cameras, and a computer linked to at least one camera, wherein the system comprises an extended calibration component and monitors at least one subject, and wherein the extended calibration component calibrates refraction interfaces.

20. A three-dimensional monitoring system comprising at least two cameras, and a computer linked to at least one camera, wherein the system comprises an extended calibration component and monitors at least one subject, and wherein the extended calibration component employs a ray tracing method comprising forward and backward refractions.

21. A three-dimensional monitoring system comprising at least two cameras, and a computer linked to at least one camera, wherein the system comprises an extended calibration component and monitors at least one subject, wherein the computer comprises a stereo image processing component, a target tracking and identification component, and a 3-D reconstruction component, and wherein the stereo image processing component further comprises an epipolar structure derivation component, an image segmentation component, and an image correspondence detection component.

22. The system according to claim 21, wherein the epipolar structure derivation component derives linear epipolar structure in a single medium.

23. The system according to claim 22, wherein the linear epipolar structure is derived from calibrated parameters of the cameras.

24. The system according to claim 21, wherein the epipolar structure derivation component derives non-linear epipolar structure when light passes through two or more media.

25. The system according to claim 24, wherein the non-linear epipolar structure is derived from calibrated parameters of cameras and refraction interfaces.

26. The system according to claim 21, wherein the image segmentation component employs a background subtraction method or a color space segmentation method, or the combination thereof.

27. The system according to claim 26, wherein the background subtraction method automatically and adaptively updates a background image.

28. The system according to claim 21, wherein the image correspondence detection component detects correspondence among images of the targets in all views.

29. The system according to claim 21, wherein the image correspondence detection component performs correspondence detection by employing epipolar geometry constraints.

30. A three-dimensional monitoring system comprising at least two cameras, and a computer linked to at least one camera, wherein the system comprises an extended calibration component and monitors at least one subject, wherein the computer comprises a stereo image processing component, a target tracking and identification component, and a 3-D reconstruction component, wherein the target tracking and identification component is capable of 3-D motion tracking and target identification and wherein the 3-D motion tracking extracts corresponding image sets obtained from image correspondence detection.

31. The system according to claim 30, wherein the 3-D motion tracking further employs a 3-D Kalman predictor-corrector method to track the target images over two consecutive frames.

32. The system according to claim 30, wherein the target tracking and identification component identifies the target images on an acquired frame and automatically assigns tags to the target images.

33. The system according to claim 30, wherein the target tracking and identification component identifies the target images by applying minimum of energy principle on spatial consistency or temporal consistency, and/or the combination thereof.

34. The system according to claim 33, wherein the spatial consistency is the tendency of corresponding target images to satisfy epipolar constraints.

35. The system according to claim 33, wherein the temporal consistency is the tendency of an image associated with a target to stay close with a previous image of the same target in a short time.

* * * * *